United States Patent
Umeda et al.

(10) Patent No.: US 7,625,643 B2
(45) Date of Patent: *Dec. 1, 2009

(54) MAGNETIC RECORDING MEDIUM, MAGNETIC STORAGE APPARATUS AND RECORDING METHOD

(75) Inventors: Hisashi Umeda, Higashine (JP); Iwao Okamoto, Higashine (JP)

(73) Assignee: Fujitsu Limited, Kawasaki (JP)

( * ) Notice: Subject to any disclaimer, the term of this patent is extended or adjusted under 35 U.S.C. 154(b) by 346 days.

This patent is subject to a terminal disclaimer.

(21) Appl. No.: 11/893,253

(22) Filed: Aug. 14, 2007

(65) Prior Publication Data

US 2008/0002296 A1    Jan. 3, 2008

Related U.S. Application Data

(62) Division of application No. 10/850,988, filed on May 21, 2004, now Pat. No. 7,271,984.

(30) Foreign Application Priority Data

Sep. 5, 2003    (JP)    ............... 2003-314400

(51) Int. Cl.
  G11B 5/66    (2006.01)
  G11B 5/673   (2006.01)
(52) U.S. Cl. ............... 428/828; 428/828.1; 360/131
(58) Field of Classification Search ............... None
See application file for complete search history.

(56) References Cited

U.S. PATENT DOCUMENTS

| | | | |
|---|---|---|---|
| 5,585,986 A | 12/1996 | Parkin | |
| 5,851,643 A | 12/1998 | Honda et al. | |
| 6,280,813 B1 | 8/2001 | Carey et al. | |
| 6,391,430 B1 | 5/2002 | Fullerton et al. | |
| 6,602,612 B2 | 8/2003 | Abarra et al. | |
| 6,645,646 B1 | 11/2003 | Umeda et al. | |
| 6,753,101 B1 | 6/2004 | Abarra et al. | |
| 6,803,117 B2 | 10/2004 | Akimoto et al. | |
| 6,881,496 B2 * | 4/2005 | Okamoto | 428/828 |
| 7,070,870 B2 | 7/2006 | Bertero et al. | |

(Continued)

FOREIGN PATENT DOCUMENTS

EP    1 059 629    12/2000

(Continued)

OTHER PUBLICATIONS

Lyberatos, A. Ju, G. van de Verrdonk, J., and Weller D., J. App. Phys. 91(4), 2002, 2236-2242.

Primary Examiner—Kevin M Bernatz
(74) Attorney, Agent, or Firm—Greer, Burns & Crain, Ltd.

(57) ABSTRACT

A magnetic recording medium is provided with a first magnetic layer, a nonmagnetic coupling layer provided on the first magnetic layer, and a second magnetic layer provided on the nonmagnetic coupling layer. The first and second magnetic layers are exchange-coupled, and have magnetization directions which are mutually parallel in a state where no external magnetic field is applied thereto, and the first magnetic layer switches the magnetization direction thereof before the second magnetic layer in response to a recording magnetic field which switches the magnetization directions of the first and second magnetic layers.

25 Claims, 13 Drawing Sheets

U.S. PATENT DOCUMENTS

| | | |
|---|---|---|
| 7,271,984 B2 * | 9/2007 | Umeda et al. ............... 360/131 |
| 2003/0017369 A1 | 1/2003 | Hirayama et al. |
| 2005/0014028 A1 | 1/2005 | Umeda et al. |

FOREIGN PATENT DOCUMENTS

| | | |
|---|---|---|
| EP | 1 059 629 A2 | 12/2000 |
| EP | 1 298 648 | 4/2003 |
| EP | 1 343 147 | 9/2003 |
| JP | 07-057236 | 3/1995 |
| JP | 2001-056921 | 2/2001 |
| JP | 2001-56923 | 2/2001 |
| JP | 2001-056924 | 2/2001 |
| JP | 2001-56925 | 2/2001 |
| JP | 2003-16624 | 1/2003 |
| JP | 2003-99911 | 4/2003 |
| JP | 2005-32353 | 2/2005 |
| WO | WO 01/22407 A1 | 3/2001 |
| WO | WO 02/45080 A1 | 6/2002 |

* cited by examiner

MAGNETIC RECORDING MEDIUM, MAGNETIC STORAGE APPARATUS AND RECORDING METHOD

This is a divisional of application Ser. No. 10/850,988, filed May 21, 2004 now U.S. Pat. No. 7,271,984.

This application claims the benefit of a Japanese Patent Application No. 2003-314400 filed Sep. 5, 2003, in the Japanese Patent Office, the disclosure of which is hereby incorporated by reference.

BACKGROUND OF THE INVENTION

1. Field of the Invention

The present invention generally relates to magnetic recording media, magnetic storage apparatuses and recording methods, and more particularly to a magnetic recording medium which is suited for high-density recording, a magnetic storage apparatus which uses such a magnetic recording medium, and a recording method for recording information on such a magnetic recording medium.

2. Description of the Related Art

Recently, the recording densities of magnetic recording media have increased rapidly, even at a rate reaching 100% per year. However, in the popularly employed longitudinal (or in-plane) recording system, it is expected that a limit of the longitudinal recording density will be on the order of 100 Gb/in$^2$, because of problems associated with thermal stability of the magnetic recording medium. In order to reduce the medium noise in the high-density recording region, the size of crystal grain forming the magnetization unit is reduced, so as to reduce the zigzag of the boundary between the magnetization units, that is, the magnetization transition region. However, when the size of the crystal grain is reduced, the volume forming the magnetization unit decreases, to thereby cause the magnetization to decrease due to thermal instability. Accordingly, in order to achieve a high recording density exceeding 100 Gb/in$^2$, it is necessary to simultaneously reduce the medium noise and improve the thermal stability.

Magnetic recording media which simultaneously reduce the medium noise and improve the thermal stability have been proposed in Japanese Laid-Open Patent Applications No. 2001-056921 and No. 2001-056924, for example. FIG. 1 is a cross sectional view showing a part of a proposed magnetic recording medium 100. The proposed magnetic recording medium 100 shown in FIG. 1 includes an exchange layer structure provided on a substrate 105, and a magnetic layer 102 provided on the exchange layer structure. The exchange layer structure is made up of a ferromagnetic layer 101 provided on the substrate 105, and a nonmagnetic coupling layer 103 provided on the ferromagnetic layer 101. The ferromagnetic layer 101 and the magnetic layer 102 are exchange-coupled anti-ferromagnetically via the nonmagnetic coupling layer 103. The effective crystal grain volume becomes the sum of crystal grain volumes of the ferromagnetic layer 101 and the magnetic layer 102 which are exchange-coupled. Consequently, the thermal stability is greatly improved, and the medium noise can be reduced because the crystal grain size can further be reduced. By using the proposed magnetic recording medium 100, the thermal stability of the recorded (written) bits improve, and the medium noise is reduced, thereby enabling a highly reliable high-density recording.

In the proposed magnetic recording medium 100, the reproduced output is approximately proportional to a difference between the remanent magnetizations of the magnetic layer 102 and the ferromagnetic layer 101, because the magnetization directions of the magnetic layer 102 and the ferromagnetic layer 101 are mutually antiparallel. Hence, in order to obtain a reproduced output comparable to that obtained by the conventional magnetic recording medium having the magnetic layer with the single-layer structure, the magnetic layer 102 closer to a recording and/or reproducing magnetic head is set thicker than the ferromagnetic layer 101 which is further away from the magnetic head, and also thicker than the conventional magnetic layer having the single-layer structure, if materials having the same composition are used for the magnetic layer 102 and the ferromagnetic layer 101. However, when the proposed magnetic recording medium 100 has the magnetic layer 102 with such a thickness, there is a possibility of deteriorating the write performances, such as the overwrite performance and the Non-Linear-Transition-Shift (NLTS) performance, due to the increased thickness of the magnetic layer 102.

On the other hand, when a recording magnetic field is applied to the proposed magnetic recording medium 100 from the magnetic head at the time of the recording, the magnetization directions of the magnetic layer 102 and the ferromagnetic layer 101 align in the direction of the recording magnetic field and become mutually parallel. Thereafter, when the magnetic head moves and the recording magnetic field weakens, the magnetization direction of the ferromagnetic layer 101 switches in response to an exchange field of the magnetic layer 102 and the magnetization directions of the ferromagnetic layer 101 and the magnetic layer 102 become mutually antiparallel. However, in a vicinity of a magnetic pole of the magnetic head at a trailing edge along the moving direction of the magnetic head, the behaviors of the magnetic layer 102 and the ferromagnetic layer 101, such as the switching of the magnetization directions, immediately after switching the direction of the recording magnetic field, become complex due to the exchange field and the demagnetization field of each of the magnetic layer 102 and the ferromagnetic layer 101. With respect to the magnetic layer 102, the position, inclination and the like of the magnetization transition region may change and the NLTS performance may deteriorate, particularly due to the magnetic characteristics and the like of the ferromagnetic layer 101.

SUMMARY OF THE INVENTION

Accordingly, it is a general object of the present invention to provide a novel and useful magnetic recording medium, magnetic storage apparatus and recording method in which the problems described above are suppressed.

Another and more specific object of the present invention is to provide a magnetic recording medium, a magnetic storage apparatus and a recording method, which can realize satisfactory write performances.

Still another object of the present invention is to provide a magnetic recording medium comprising a first magnetic layer; a nonmagnetic coupling layer provided on the first magnetic layer; and a second magnetic layer provided on the nonmagnetic coupling layer, the first and second magnetic layers being exchange-coupled, and having magnetization directions which are mutually parallel in a state where no external magnetic field is applied thereto, the first magnetic layer switching the magnetization direction thereof before the second magnetic layer in response to a recording magnetic field which switches the magnetization directions of the first and second magnetic layers. According to the magnetic recording medium of the present invention, it is possible to improve the write performances and realize a high-density recording.

A further object of the present invention is to provide a magnetic recording medium comprising a first magnetic layer; a nonmagnetic coupling layer provided on the first magnetic layer; and a second magnetic layer provided on the nonmagnetic coupling layer, the first and second magnetic layers being exchange-coupled, and having magnetization directions which are mutually parallel in a state where no external magnetic field is applied thereto, wherein a dynamic coercivity Hc1' of the first magnetic layer and a dynamic coercivity Hc2' of the second magnetic layer satisfy a relationship Hc1'<Hc2'. According to the magnetic recording medium of the present invention, it is possible to improve the write performances and realize a high-density recording.

Another object of the present invention is to provide a magnetic recording medium comprising a first magnetic layer; a nonmagnetic coupling layer provided on the first magnetic layer; and a second magnetic layer provided on the nonmagnetic coupling layer, the first and second magnetic layers being exchange-coupled, and having magnetization directions which are mutually parallel in a state where no external magnetic field is applied thereto, wherein the first magnetic layer is made of a CoCr or CoCrPt alloy, the second magnetic layer is made of a CoCrPt alloy, and a Pt content in at. % of the first magnetic layer is lower than that of the second magnetic layer. According to the magnetic recording medium of the present invention, it is possible to improve the write performances and realize a high-density recording.

Still another object of the present invention is to provide a magnetic storage apparatus comprising at least one magnetic recording medium comprising a first magnetic layer, a nonmagnetic coupling layer provided on the first magnetic layer, and a second magnetic layer provided on the nonmagnetic coupling layer, the first and second magnetic layers being exchange-coupled and having magnetization directions which are mutually parallel in a state where no external magnetic field is applied thereto; and a head to record information on and/or reproduce information from the magnetic recording medium, wherein the first magnetic layer switches the magnetization direction thereof before the second magnetic layer in response to a recording magnetic field from the head which switches the magnetization directions of the first and second magnetic layers. According to the magnetic storage apparatus of the present invention, it is possible to realize a high-density recording which is highly reliable, because the write performances of the magnetic recording medium are satisfactory, the thermal stability of the written bits is improved and the medium noise is reduced.

A further object of the present invention is to provide a magnetic storage apparatus comprising at least one magnetic recording medium comprising a first magnetic layer, a nonmagnetic coupling layer provided on the first magnetic layer, and a second magnetic layer provided on the nonmagnetic coupling layer, the first and second magnetic layers being exchange-coupled and having magnetization directions which are mutually parallel in a state where no external magnetic field is applied thereto; and a head to record information on and/or reproduce information from the magnetic recording medium, wherein a dynamic coercivity Hc1' of the first magnetic layer and a dynamic coercivity Hc2' of the second magnetic layer satisfy a relationship Hc1'<Hc2'. According to the magnetic storage apparatus of the present invention, it is possible to realize a high-density recording which is highly reliable, because the write performances of the magnetic recording medium are satisfactory, the thermal stability of the written bits is improved and the medium noise is reduced.

Another object of the present invention is to provide a magnetic storage apparatus comprising at least one magnetic recording medium comprising a first magnetic layer, a nonmagnetic coupling layer provided on the first magnetic layer, and a second magnetic layer provided on the nonmagnetic coupling layer, the first and second magnetic layers being exchange-coupled and having magnetization directions which are mutually parallel in a state where no external magnetic field is applied thereto; and a head to record information on and/or reproduce information from the magnetic recording medium, wherein the first magnetic layer is made of a CoCr or CoCrPt alloy, the second magnetic layer is made of a CoCrPt alloy, and a Pt content in at. % of the first magnetic layer is lower than that of the second magnetic layer. According to the magnetic storage apparatus of the present invention, it is possible to realize a high-density recording which is highly reliable, because the write performances of the magnetic recording medium are satisfactory, the thermal stability of the written bits is improved and the medium noise is reduced.

Still another object of the present invention is to provide a recording method for magnetically recording information on a magnetic recording medium which comprises a first magnetic layer, a nonmagnetic coupling layer provided on the first magnetic layer, and a second magnetic layer provided on the nonmagnetic coupling layer, the first and second magnetic layers being exchange-coupled and having magnetization directions which are mutually parallel in a state where no external magnetic field is applied thereto, the recording method comprising the steps of applying a recording magnetic field on the magnetic recording medium to record the information on the magnetic recording medium, wherein a recording magnetic field Hh1 applied to the first magnetic layer, a recording magnetic field Hh2 applied to the second magnetic layer, an exchange field HE1 acting on the first magnetic layer from the second magnetic layer, an exchange field HE2 acting on the second magnetic layer from the first magnetic layer, a dynamic coercivity Hc1' of the first magnetic layer, and a dynamic coercivity Hc2' of the second magnetic layer satisfy a relationship (Hh1−HE1−Hc1')>(Hh2−HE2−Hc2')>0. According to the recording method of the present invention, it is possible to improve the write performance and realize a high-density recording.

A further object of the present invention is to provide a recording method for magnetically recording information on a magnetic recording medium which comprises a ferromagnetic layer, a first nonmagnetic coupling layer, a first magnetic layer, a second nonmagnetic coupling layer and a second magnetic layer which successively stacked, the ferromagnetic layer and the first magnetic layer being exchange-coupled and having magnetization directions which are mutually antiparallel in a state where no external magnetic field is applied thereto, the first and second magnetic layers being exchange-coupled and having magnetization directions which are mutually parallel in a state where no external magnetic field is applied thereto, the recording method comprising the steps of applying a recording magnetic field on the magnetic recording medium to record the information on the magnetic recording medium by switching the magnetization directions of the first and second magnetic layers, wherein the magnetization direction of the ferromagnetic layer switches when the recording magnetic field is removed after applying the recording magnetic field to make the magnetization directions of the ferromagnetic layer and the first and second magnetic layers mutually parallel, and the magnetization direction of the ferromagnetic layer and the magnetization directions of the first and second magnetic layers are mutually antiparallel in a state where no recording magnetic field is applied thereto. According to the recording method of the present invention, it is possible to improve the write performance and realize a high-density recording.

Other objects and further features of the present invention will be apparent from the following detailed description when read in conjunction with the accompanying drawings.

DESCRIPTION OF THE PREFERRED EMBODIMENTS

First, a description will be given of an operating principle of the present invention, by referring to FIGS. 2 through 9.

Figure 1:
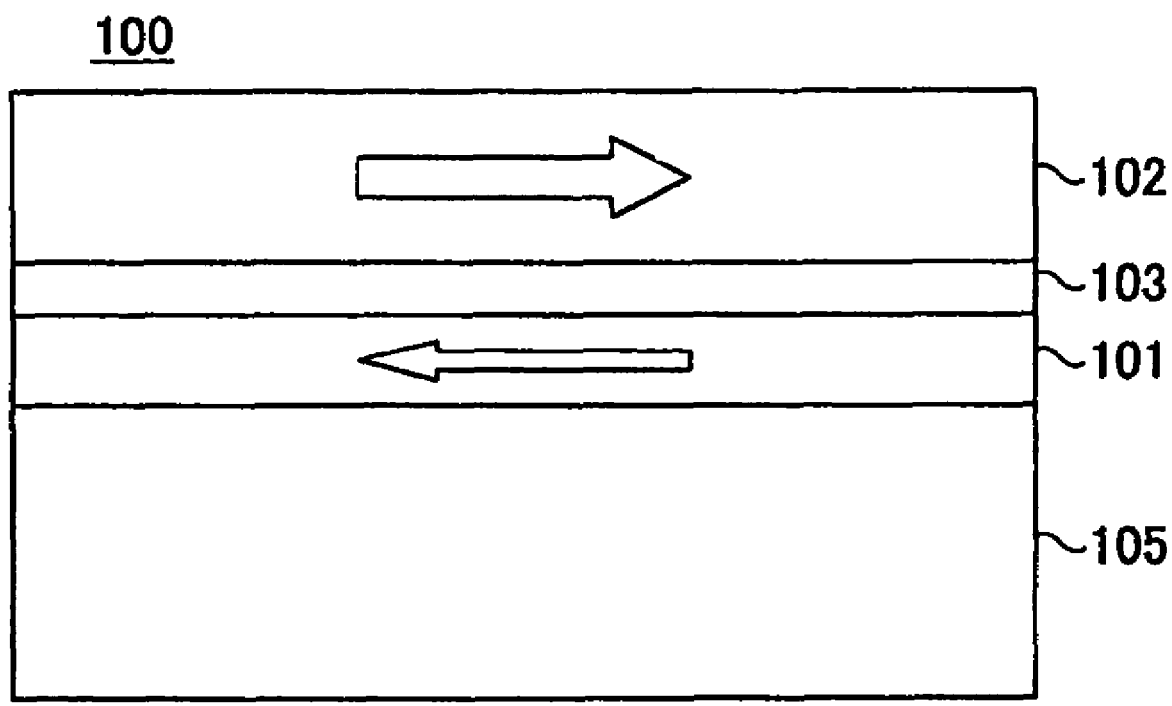
FIG. 1 is a cross sectional view showing a part of a proposed magnetic recording medium.
Figure 2:
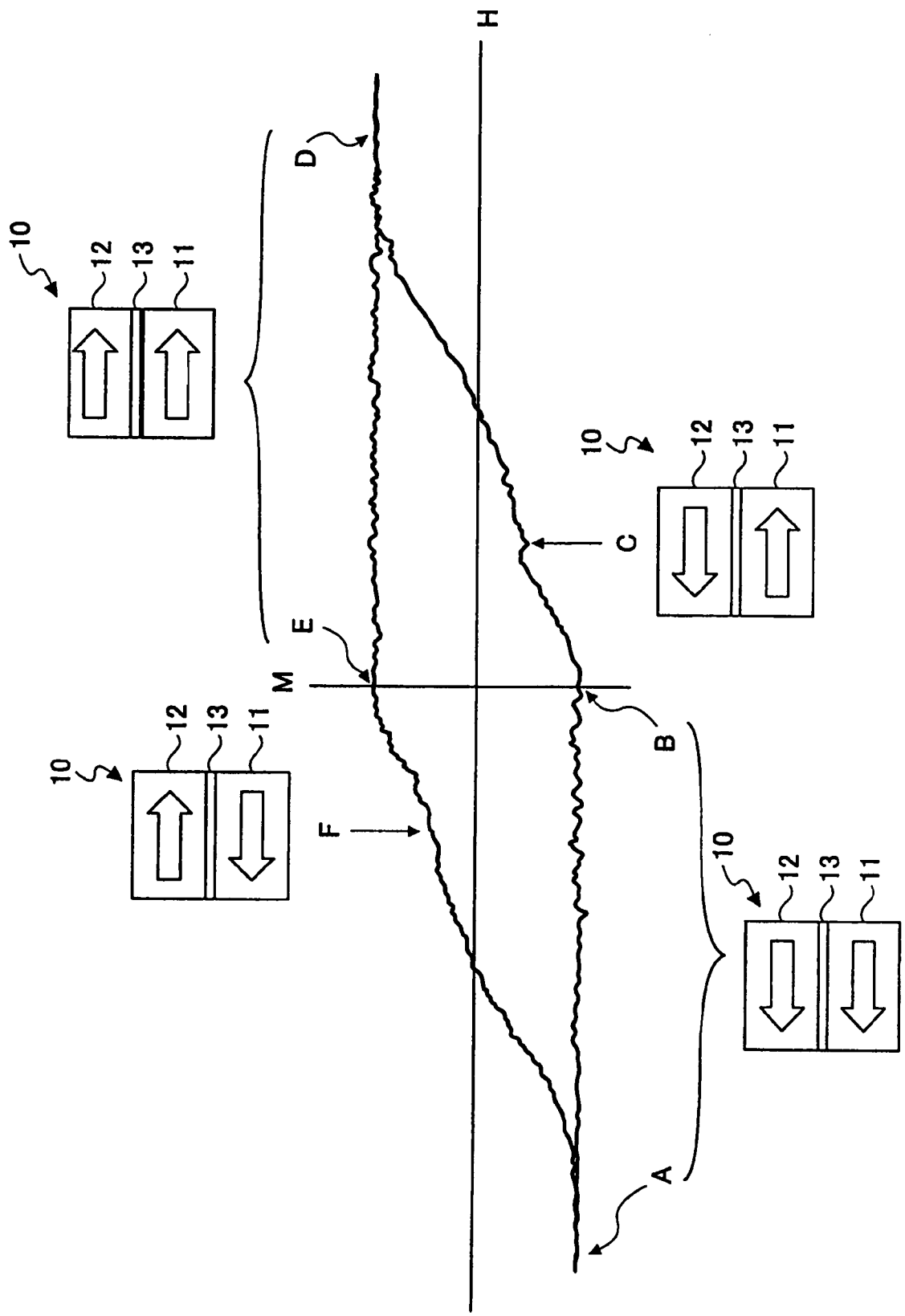
FIG. 2 is a diagram showing a static magnetic characteristic of a magnetic recording medium according to the present invention.
Figure 14:
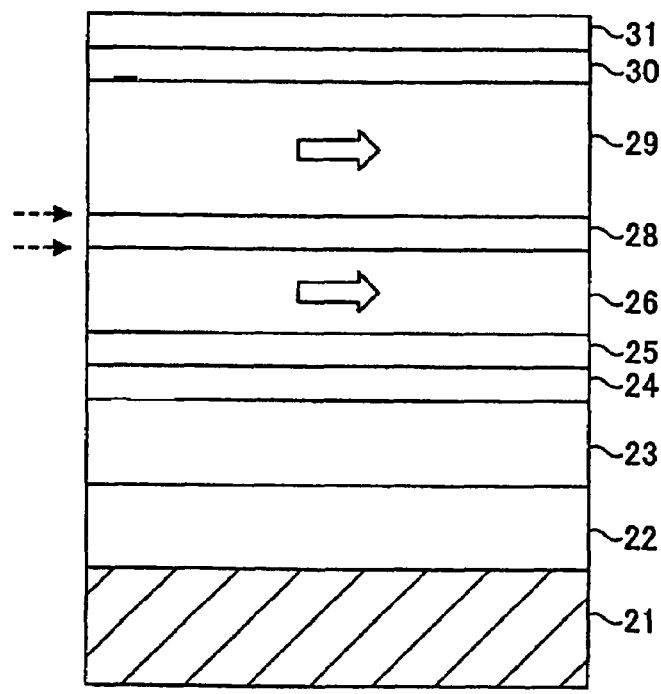
FIG. 14 is a cross sectional view showing a part of a first embodiment of the magnetic recording medium according to the present invention.

FIG. 2 is a diagram showing a static magnetic characteristic of a magnetic recording medium according to the present invention, together with magnetization states of first and second magnetic layers of the magnetic recording medium. In FIG. 2, the ordinate indicates the magnetization M in arbitrary units, and the abscissa indicates the external magnetic field H in arbitrary units. As shown in FIG. 2 and FIG. 14 which will be described later, a magnetic recording medium 10 according to the present invention includes a stacked structure made up of a first magnetic layer 11, a nonmagnetic coupling layer 13 and a second magnetic layer 12. The first magnetic layer 11 is disposed closer to a substrate (not shown) than the second magnetic layer 12, and the second magnetic layer 12 is disposed closer to a magnetic head (not shown) than the first magnetic layer 11. The first magnetic layer 11 and the second magnetic layer 12 are exchange-coupled via the nonmagnetic coupling layer 13. In states B and E where no external magnetic field H is applied, the magnetization directions of the first magnetic layer 11 and the second magnetic layer 12 are mutually parallel.

More particularly, when the external magnetic field H is increased from the state B to a state C or, from the state E to a state F in FIG. 2, in directions opposite to the mutually parallel magnetization directions of the first magnetic layer 11 and the second magnetic layer 12, the magnetization curve becomes approximately horizontal at the state C or F. In the states C and F, the magnetization direction of the first magnetic layer 11 switches, and the magnetization directions of the first magnetic layer 11 and the second magnetic layer 12 become mutually antiparallel.

Next, when the external magnetic field H is further increased from the state C towards a state D or, from the state F towards a state A, the magnetization M becomes zero, and the value of the external magnetic field H at this zero magnetization M becomes the coercivity Hc, that is, the static coercivity. When the external magnetic field H is further increased, the magnetization directions of the first magnetic layer 11 and the second magnetic layer 12 become mutually parallel in the states D and A. Even when the external magnetic field H is thereafter decreased from the state D to the state E or, from the state A to the state B, and the external magnetic field H becomes zero, the magnetization directions of the first magnetic layer 11 and the second magnetic layer 12 remain mutually parallel.

It should be noted that the magnetization directions of the first magnetic layer 11 and the second magnetic layer 12 are mutually parallel in the state where the external magnetic field H is zero, and that when the direction of the external magnetic field H is switched and the external magnetic field H is increased, the magnetization direction of the first magnetic layer 11 switches first, and the magnetization direction of the second magnetic layer 12 switches thereafter.

The static magnetic characteristic is measured by a Vibration Sample Magnetometer (VSM) or the like, and the measuring time of one loop is on the order of approximately several minutes. A time required to switch the direction of the external magnetic field H is on the order of approximately several seconds. Such a time required to switch the direction of the external magnetic field H will hereinafter be referred to as a "magnetic field switching time", and the coercivity Hc for a case where the magnetic field switching time is on the order of seconds or greater will hereinafter be referred to as a static coercivity Hc.

On the other hand, the magnetic field switching time at the time of the recording when the magnetic head applies the magnetic field on the magnetic recording medium 10 is on the sub-nano-second to approximately one nano-second order. When switching the magnetic field in such a short magnetic field switching time, a force (for example, a viscous force) acts in a direction interfering with the magnetization motion, and a large magnetic field needs to be applied in order to switch the magnetization direction. In other words, the coercivity Hc increases, and this coercivity Hc which increases in such a manner will be referred to as a dynamic coercivity Hc'.

Figure 3:
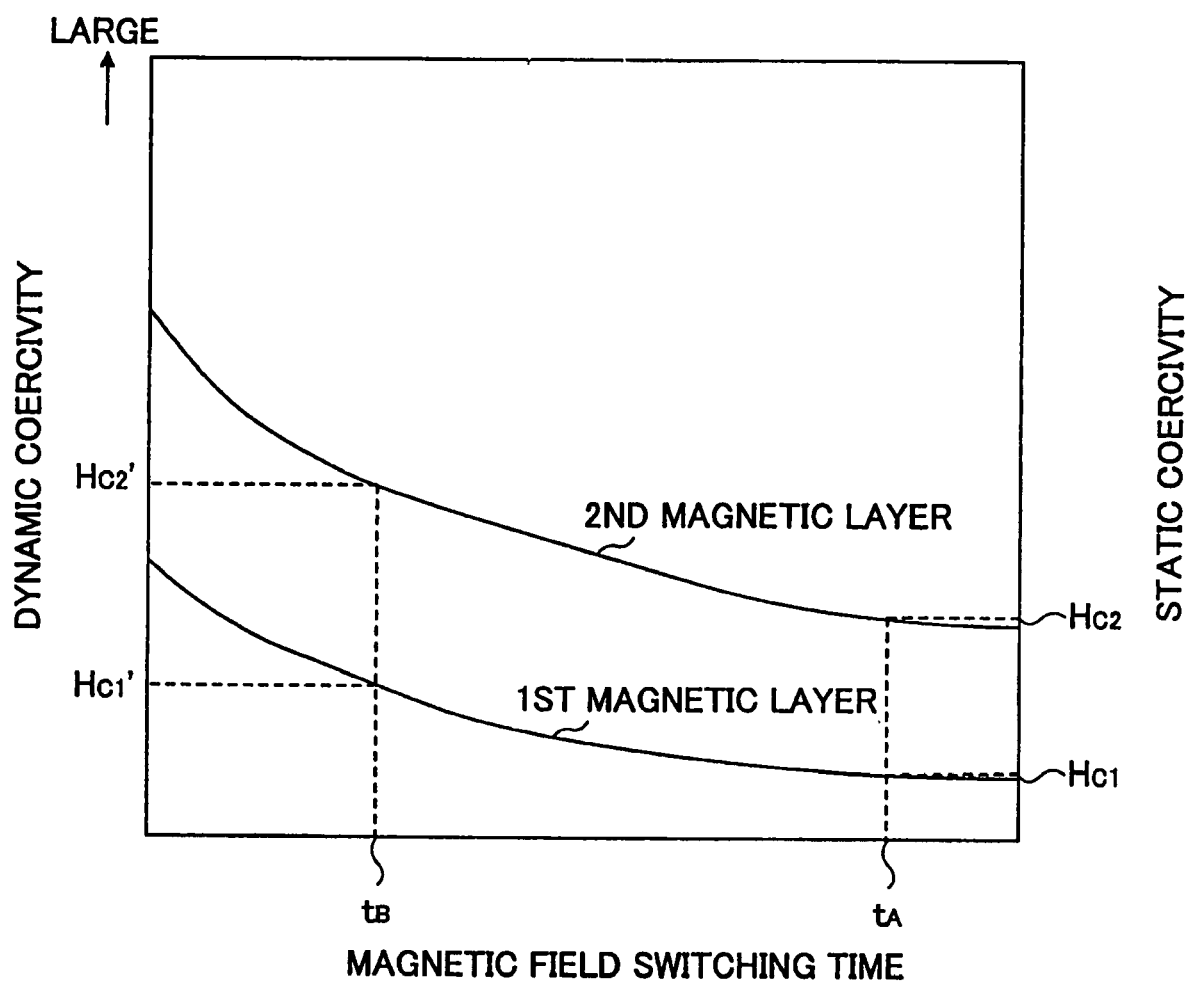
FIG. 3 is a diagram showing a relationship of dynamic coercivities and static coercivities of first and second magnetic layers of the magnetic recording medium according to the present invention.

FIG. 3 is a diagram showing a relationship of the dynamic coercivities and the static coercivities of the first magnetic layer 11 and the second magnetic layer 12 of the magnetic recording medium 10 according to the present invention. In FIG. 3, the left ordinate indicates the dynamic coercivity in arbitrary units, the right ordinate indicates the static coercivity in arbitrary units, and the abscissa indicates the magnetic field switching time.

As shown in FIG. 3, in the magnetic recording medium 10 of the present invention, a static coercivity Hc1 of the first magnetic layer 11 and a static coercivity Hc2 of the second magnetic layer 12 satisfy a relationship Hc1<Hc2 during a magnetic field switching time tA which is on the order of approximately several seconds. On the other hand, a dynamic coercivity Hc1' of the first magnetic layer 11 and a dynamic coercivity Hc2' of the second magnetic layer 12 satisfy a relationship Hc1'<Hc2' during a magnetic field switching time tB which is on the sub-nano-second to approximately one nano-second order at the time of the recording using the recording magnetic field of the magnetic head. As the magnetic field switching time decreases from the magnetic field switching time tA of the static coercivity towards the magnetic field switching time tB of the dynamic coercivity, the dynamic coercivities Hc1' and Hc2' increase.

It is preferable that the dynamic coercivity Hc1' of the first magnetic layer 11 is sufficiently small compared to the dynamic coercivity Hc2' of the second magnetic layer 12. As may be seen from FIG. 3, when a certain recording magnetic field is applied, a magnetization switching time in which the magnetization direction switches is shorter for the first magnetic layer 11 than for the second magnetic layer 12. Hence, when the recording magnetic field is applied to the first magnetic layer 11 and the second magnetic layer 12, the magnetization direction of the first magnetic layer 11 is switched before the magnetization direction of the second magnetic layer 12.

FIGS. 4 through 9 are diagrams for explaining the recording of the magnetic recording medium according to the present invention. FIGS. 4 through 9 show the states of the magnetic recording medium 10 at various points in time when the magnetic recording medium 10 moves towards the left in each of these figures, that is, a magnetic head 14 moves continuously towards the right relative to the magnetic recording medium 10 in each of these figures.

Figure 4:
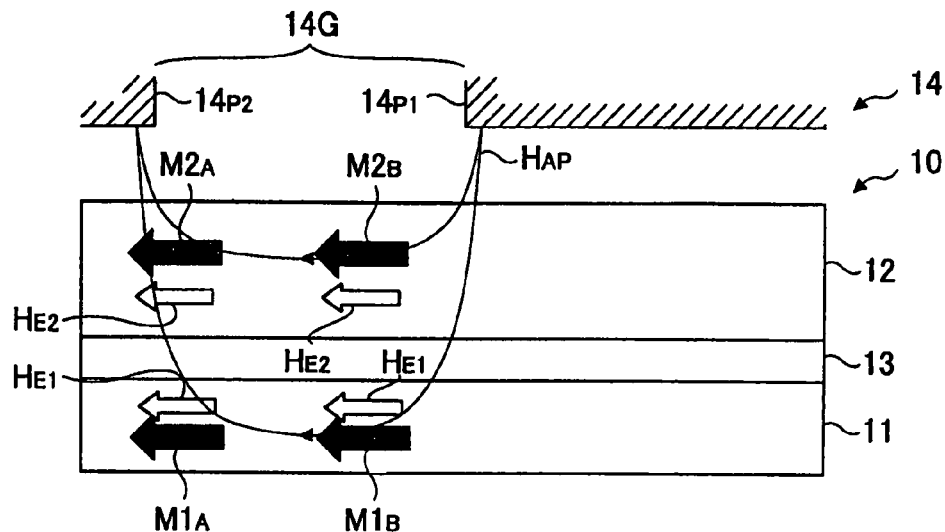
FIG. 4 is a diagram for explaining a recording with respect to the magnetic recording medium according to the present invention.

In the state shown in FIG. 4, a recording magnetic field HAP is applied in the left direction from a magnetic pole 14P1 to a magnetic pole 14P2 across a gap 14G, while the magnetic head 14 disposed closer to the second magnetic layer 12 of the magnetic recording medium 10 moves from the left to right. The first magnetic layer 11 and the second magnetic layer 12 are magnetized in the left direction by the recording magnetic field HAP, and the directions of magnetizations M1A and M1B of the first magnetic layer 11 are parallel to the directions of magnetizations M2A and M2B of the second magnetic layer 12. In addition, due to the exchange coupling of the first magnetic layer 11 and the second magnetic layer 12, exchange fields HE1 and HE2 are applied in the left direction with respect to the magnetizations M1A, M1B, M2A and M2B of the first magnetic layer 11 and the second magnetic layer 12.

Figure 5:
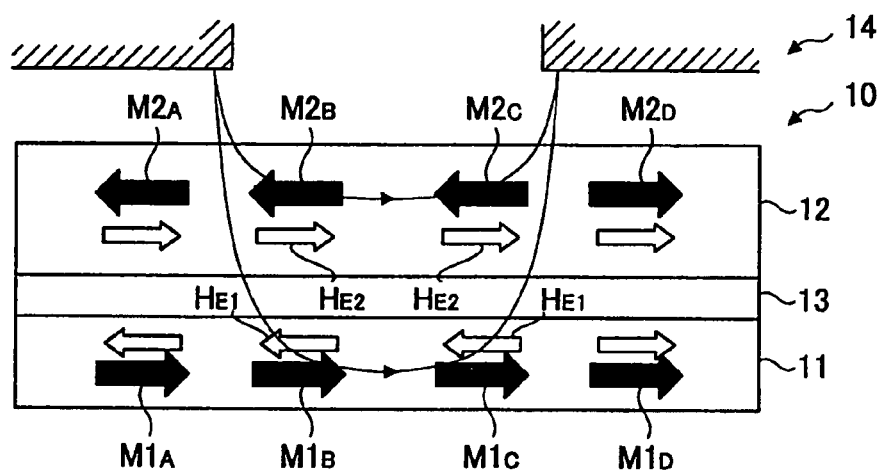
FIG. 5 is a diagram for explaining the recording with respect to the magnetic recording medium according to the present invention.

In the state shown in FIG. 5, the direction of the recording magnetic field HAP is switched when the magnetic head 14 is moved to the right. As described above in conjunction with FIG. 3, when the recording magnetic field HAP is switched, the magnetization direction of the first magnetic layer 11 switches before the magnetization direction of the second magnetic layer 12.

Since the dynamic coercivity Hc1' of the first magnetic layer 11 is small in this state shown in FIG. 5, the magnetization of the first magnetic layer 11 switches within a large range including the magnetizations M1A through M1D. In this state, the exchange field HE2 from the magnetizations M1A through M1D of the first magnetic layer 11 acts in the same direction as the recording magnetic field HAP, and a field HAP+HE2 is applied to the magnetizations M2B and M2C of the second magnetic layer 12, thereby making it easier for the direction of the magnetizations M2B and M2C to switch compared to a case where only the recording magnetic field HAP is applied thereto. With respect to the switching of the recording magnetic field HAP, it is preferable that the magnetization directions of the first magnetic layer 11 and the second magnetic layer 12 are switched within a time which is short as much as possible.

Figure 6:
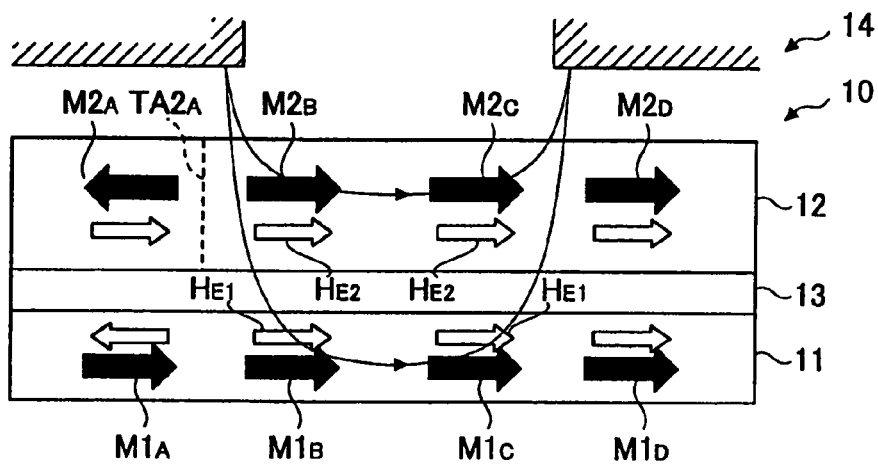
FIG. 6 is a diagram for explaining the recording with respect to the magnetic recording medium according to the present invention.

FIG. 6 shows the state after a slight lapse of time from the state shown in FIG. 5. In the state shown in FIG. 6 where the positional relationship of the magnetic recording medium 10 and the magnetic head 14 is virtually unchanged from that of the state shown in FIG. 5, the directions of the magnetizations M1A through M1D of the first magnetic layer 11 are switched, and the large field HAP+HE2 is then applied to the magnetizations M2B and M2C of the second magnetic layer 12 in the vicinity of the magnetic pole 14P2 on the trailing end with respect to the moving direction of the magnetic head 14 to switch the directions of the magnetizations M2B and M2C. Because the exchange field HE2 is applied in the same direction in addition to the recording magnetic field HAP, the directions of the magnetizations M2B and M2C are easily switched, thereby improving the overwrite performance. Moreover, since the directions of the magnetizations M1A through M1D of the first magnetic layer 11 switches and the directions of the magnetizations M2B and M2C of the second magnetic layer 12 switches thereafter with respect to the switching timing of the recording magnetic field HAP, a magnetization transition region TA2A of the second magnetic layer 12 is formed at a position approximately corresponding to the switching timing of the recording magnetic field HAP. Therefore, compared to a magnetic recording medium 110 not employing the present invention which will be described later in conjunction with FIGS. 10 through 13, the NLTS performance is improved.

Figure 7:
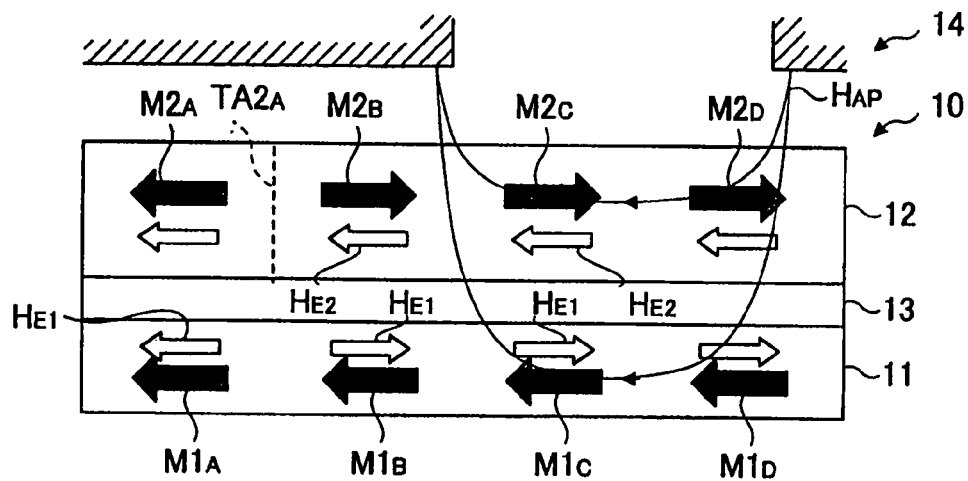
FIG. 7 is a diagram for explaining the recording with respect to the magnetic recording medium according to the present invention.
Figure 8:
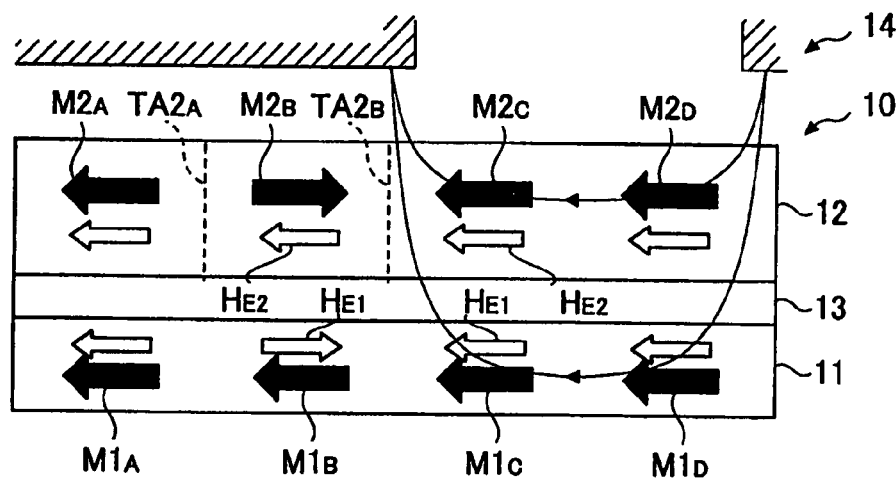
FIG. 8 is a diagram for explaining the recording with respect to the magnetic recording medium according to the present invention.

In the state shown in FIG. 7, the magnetic head 14 has moved more to the right from the state shown in FIG. 6, and the direction of the recording magnetic field HAP is switched. Hence, a phenomenon similar to that described above in conjunction with FIG. 5 occurs. That is, the magnetization direction of the first magnetic layer 11 is switched within a large range including the magnetizations M1A through M1D, and in the state shown in FIG. 8 which occurs after a slight time elapses from the state shown in FIG. 7, a field HAP+ HE2, which is the sum of the recording magnetic field HAP and the exchange field HE2 from the magnetizations M1C and M1D of the first magnetic layer 11, is applied to the second magnetic layer 12, thereby switching the directions of the magnetizations M2C and M2D of the second magnetic layer 12 and forming a magnetization transition region TA2B.

Figure 9:
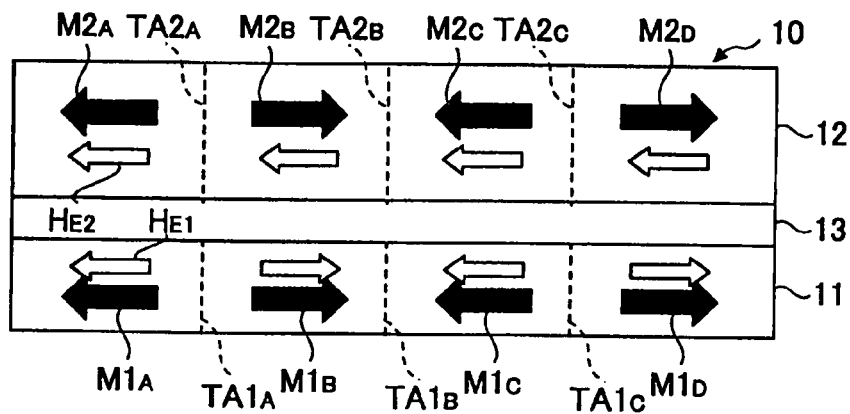
FIG. 9 is a diagram for explaining the recording with respect to the magnetic recording medium according to the present invention.

FIG. 9 shows the state after a time on the order of approximately several milliseconds elapses after the recording described above in conjunction with FIG. 8. Of course, the recording in which the recording magnetic field HAP of the magnetic head 14 is switched is repeated after the state shown in FIG. 8. After the recording, when the recording magnetic field HAP of the magnetic head 14 is no longer applied, the magnetizations M1A through M1D of the first magnetic layer become parallel to the magnetizations M2A through M2D of the second magnetic layer due to the exchange field HE1 acting on the first magnetic layer 11 from the second magnetic layer 12. Hence, the magnetic recording medium 10 attempts to the state having the stable ferromagnetic coupling, and the magnetization transition regions TA1A through TA1C of the first magnetic layer 11 are formed. The magnetization transition regions TA1A through TA1C of the first magnetic layer 11 approximately match the magnetization transition regions TA2A through TA2C of the magnetic layer 12. Furthermore, it is possible to improve the thermal stability by the magnetic coupling effect of the second magnetic layer 12 and the first magnetic layer 11.

A magnetization attempt time of the first magnetic layer is preferably set to approximately 10 milliseconds or less, that is, in a range of approximately 1 nanosecond to approximately 10 milliseconds. In the case of a magnetic disk apparatus, for example, if the magnetization attempt time of the first magnetic layer 11 exceeds 10 milliseconds, a leakage magnetic flux from a magnetic disk will be sensed by the magnetic head 14 before the magnetic disk makes one revolution and the magnetization of the first magnetic layer 11 attempts, and as a result, the magnetic head 14 will sense a change in the reproduced output caused by the magnetization attempt of the first magnetic layer 11. It is more preferable that the magnetizations M1A through M1D of the first magnetic layer 11 quickly follow the direction of the exchange field HE1 from the second magnetic layer 12.

In FIGS. 4 through 9, the magnetic head 14 is positioned closer to the second magnetic layer 12. However, it is of course possible to switch the positions of the first magnetic layer 11 and the second magnetic layer 12 so that the magnetic head 14 is positioned closer to the first magnetic layer 11. In this case, it is also possible to obtain the functions and effects described above for the case where the magnetic head 14 is positioned closer to the second magnetic layer 12.

For comparison purposes, a description will be given of the magnetic recording medium 110 not employing the present invention, by referring to FIGS. 10 through 13. FIGS. 10 through 13 are diagrams for explaining the recording of the magnetic recording medium 110 not employing the present invention. In FIGS. 10 through 13, those parts which are essentially the same as those corresponding parts in FIGS. 4 through 9 are designated by the same reference numerals, and a description thereof will be omitted. The magnetic recording medium 110 not employing the present invention includes a first magnetic layer 111, a nonmagnetic coupling layer 113 and a second magnetic layer 112 which are stacked in this order. The first magnetic layer 111 and the second magnetic layer 112 are antiferromagnetically coupled via the nonmagnetic coupling layer 113, and the magnetization direction of the first magnetic layer 111 switches first in response to the switching of the direction of the recording magnetic field.

Figure 10:
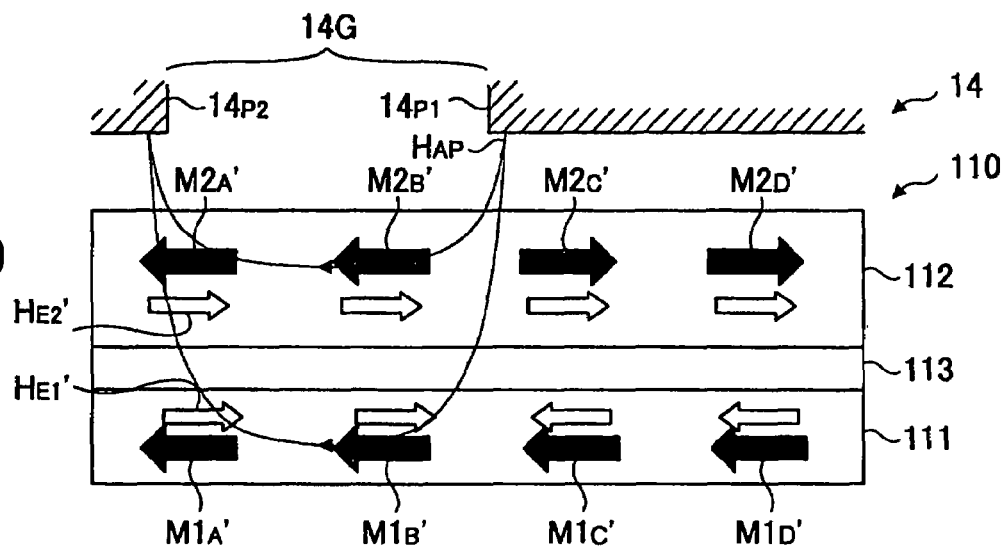
FIG. 10 is a diagram for explaining a recording with respect to a magnetic recording medium not employing the present invention.

FIG. 10 shows the state where the magnetic head 14 is moved towards the right, and the first magnetic layer 111 and the second magnetic layer 112 are magnetized in the left direction by the recording magnetic field HAP. In this state, magnetizations M1A' and M1B' of the first magnetic layer 111 and magnetizations M2A' and M2B' of the second magnetic layer 112 are mutually parallel. In addition, due to the antiferromagnetic exchange coupling of the first magnetic layer 111 and the second magnetic layer 112, exchange fields HE1 and HE2 are applied to the magnetizations M1A', M1B', M2A' and M2B' of the first magnetic layer 111 and the second magnetic layer 112 in the right direction, that is, in the direction opposite to that of the recording magnetic field HAP.

Figure 11:
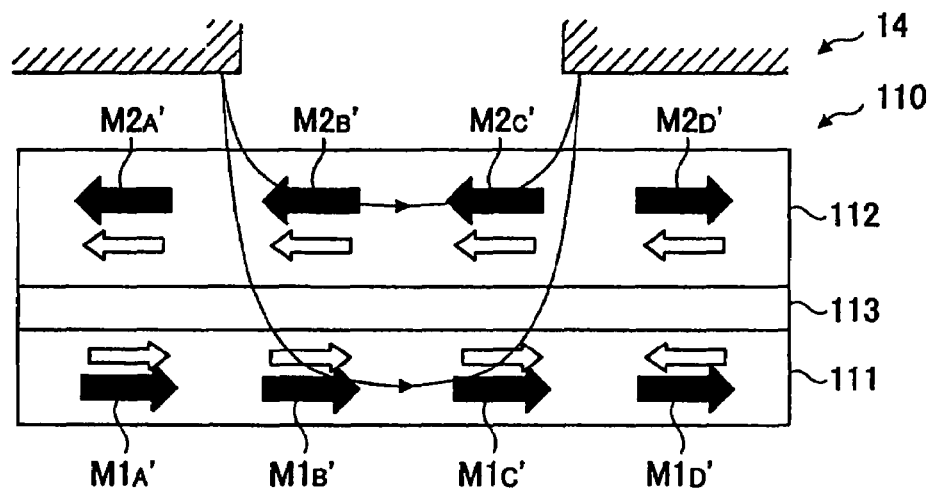
FIG. 11 is a diagram for explaining the recording with respect to the magnetic recording medium not employing the present invention.

FIG. 11 shows the state where the magnetic head 14 is moved to the right, and the direction of the recording magnetic field HAP is switched. In this case, the direction of the magnetization of the first magnetic layer 111 is switched within a large range including the magnetizations M1A' through M1D', to follow the switching of the recording magnetic field HAP of the magnetic head 14.

Figure 12:
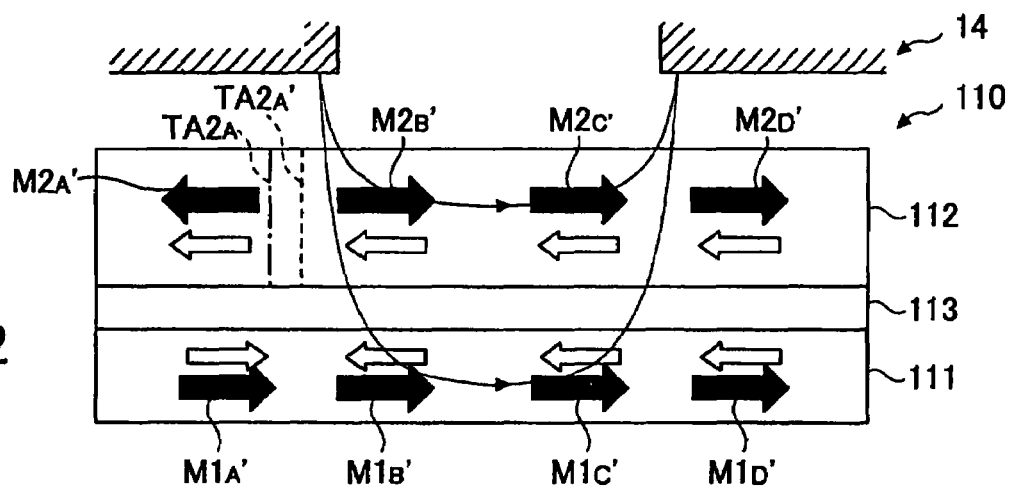
FIG. 12 is a diagram for explaining the recording with respect to the magnetic recording medium not employing the present invention.

FIG. 12 shows the state after a slight time elapses from the state shown in FIG. 11. In this state shown in FIG. 12 where the positional relationship of the magnetic recording medium 110 and the magnetic head 14 is substantially unchanged from that shown in FIG. 11, the magnetization direction of the first magnetic layer 111 switches, and then, a field HAP-HE2 is applied to the magnetizations M2B' and M2C' of the second magnetic layer 112 in the vicinity of the magnetic pole 14P2 on the trailing end with respect to the moving direction of the magnetic head 14. The recording magnetic field HAP applied to the second magnetic layer 112 is reduced by the amount of the exchange field HE2 because the exchange field HE2 acts in the opposite direction to the recording magnetic field HAP. Accordingly, the directions of the magnetizations M2B' and M2C' of the second magnetic layer 112 are uneasily switched, and the overwrite performance deteriorates. Furthermore, since the switching of the directions of the magnetizations M2B' and M2C' of the second magnetic layer 112 is delayed, a magnetization transition region TA2A' of the second magnetic layer 112 is formed at a position which is delayed in time with respect to the magnetization transition region TA2A shown in FIG. 6, and the NLTS deteriorates.

Figure 13:
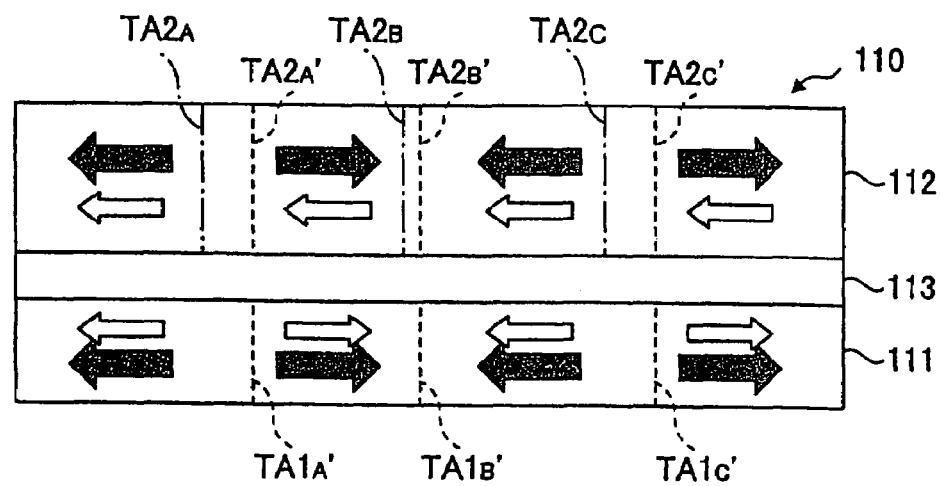
FIG. 13 is a diagram for explaining the recording with respect to the magnetic recording medium not employing the present invention.

FIG. 13 shows the state after a time on the order of approximately several milliseconds elapses after the recording described above in conjunction with FIG. 12. Of course, the recording in which the recording magnetic field HAP of the magnetic head 14 is switched is repeated after the state shown in FIG. 12. In the state shown in FIG. 13, magnetization transition regions TA2A' through TA2C' formed in the second magnetic layer 112 of the magnetic recording medium 110 are formed at positions which are shifted from and delayed in time with respect to the positions of the magnetization transition regions TA2A through TA2C formed in the second magnetic layer 12 of the magnetic recording medium 10 of the present invention. FIG. 13 shows, for comparison purposes, the corresponding positions of the magnetization transition regions TA2A through TA2C of the magnetic recording medium 10 of the present invention in relation to the positions of the magnetization transition regions TA2A' through TA2C' in the magnetic recording medium 110 not employing the present invention. The amount of shift of the magnetization transition region of the second magnetic layer 112 of the magnetic recording medium 110 with respect to the magnetization transition region of the second magnetic layer 12 of the magnetic recording medium 10 differs depending on the effects of the counter magnetic field of the immediately preceding magnetization along the moving direction of the magnetic head 14. Hence, the length of the interval between the magnetization transition regions TA2A' and TA2B' is different from that between the magnetization transition regions TA2B' and TA2C'. Consequently, the NLTS performance of the magnetic recording medium 110 is deteriorated compared to that of the magnetic recording medium 10 of the present invention. In addition, because it becomes more difficult for the direction of the magnetization of the second magnetic layer 112 to switch, the overwrite performance of the magnetic recording medium 110 also deteriorates.

On the other hand, the magnetic recording medium 10 of the present invention has improved write performances such as the NLTS performance and the overwrite performance. Furthermore, it is possible to realize a high-density recording because of the improved thermal stability obtained by the exchange coupling of the first magnetic layer 11 and the second magnetic layer 12.

Next, a description will be given of embodiments of the magnetic recording medium according to the present invention, a magnetic storage apparatus according to the present invention, and a recording method according to the present invention.

First Embodiment

FIG. 14 is a cross sectional view showing a part of a first embodiment of the magnetic recording medium according to the present invention. As shown in FIG. 14, a magnetic recording medium 20 has a substrate 21 and a stacked structure provided on the substrate 21. The stacked structure includes a first seed layer 22, a second seed layer 23, an underlayer 24, a nonmagnetic intermediate layer 25, a first magnetic layer 26, a nonmagnetic coupling layer 28, a second magnetic layer 29, a protection layer 30 and a lubricant layer 31 which are successively stacked. The magnetic recording medium 20 is characterized by an exchange-coupled structure in which the first magnetic layer 26 and the second magnetic layer 29 are ferromagnetically exchange-coupled via the nonmagnetic coupling layer 28.

The substrate 21 may be formed by a disk-shaped plastic substrate, glass substrate, NiP-plated Al alloy substrate, Si substrate and the like, for example. The substrate 21 may also be formed by tape-shaped plastic films made of PET, PEN, polyimide and the like. The substrate 21 may or may not be textured. In a case where the magnetic recording medium 20 is a magnetic disk, a texturing process is carried out in a circumferential direction of the magnetic disk, that is, in a direction in which a track on the magnetic disk extends.

The first seed layer 22 may be made of a nonmagnetic material such as NiP, CoW and CrTi. The first seed layer 22 may or may not be textured. In a case where the first seed layer 22 is made of an amorphous material such as NiP, the first seed layer 22 is preferably oxidized, so that the in-plane orientation of the c-axis improves for the first magnetic layer 26 and the second magnetic layer 29. Of course, a known material which improves the c-axis orientation may be used for the first seed layer 22 in place of NiP.

The second seed layer 23 may be made of an amorphous material such as NiP, CoW and CrTi, or an alloy having a B2 structure such as AlRu, NiAl and FeAl. In a case where the second seed layer 23 is made of the amorphous material and the underlayer 24 is made of an alloy having the B2 structure, the orientation of the (001) face or (112) face of the underlayer 24 is improved. The second seed layer 23 may or may not be textured. In a case where the magnetic recording medium 20 is the magnetic disk, the texturing process is carried out in the circumferential direction of the magnetic disk, that is, in the direction in which the track on the magnetic disk extends.

The underlayer 24 may be made of Cr or a Cr alloy such as CrMo, CrW, CrV, CrB and CrMoB, or an alloy having a B2 structure such as AlRu, NiAl and FeAl. When the underlayer 24 is epitaxially grown on the second seed layer 23, the underlayer 24 shows a good orientation of the (001) face or the (112) face in the growth direction if the alloy having the B2 structure is used for the underlayer 24, and shows a good orientation of the (002) face in the growth direction if the Cr or Cr alloy is used for the underlayer 24. The underlayer 24 may have a multi-layer structure made up of a plurality of stacked layers formed by the Cr or Cr alloy and the alloy having the B2 structure. The orientation of the underlayer 24 itself is improved by employing the multi-layer structure for the underlayer 24. In addition, by employing the multi-layer structure for the underlayer 24, a good epitaxial growth of the nonmagnetic intermediate layer 25 can be achieved, and the orientations of the first magnetic layer 26 and the second magnetic layer 29 can further be improved.

The nonmagnetic intermediate layer 25 may be made of a nonmagnetic alloy having an hcp structure and obtained by adding M to a CoCr alloy, where M denotes an element selected from Pt, B, Mo, Nb, Ta, W and Cu or an alloy thereof. The nonmagnetic intermediate layer 25 has a thickness in a range of 1 nm to 5 nm. The nonmagnetic intermediate layer 25 is epitaxially grown to inherit the crystal properties and crystal grain sizes of the underlayer 24. Hence, the nonmagnetic intermediate layer 25 improves the crystal properties of the first magnetic layer 26 and the second magnetic layer 29 which are epitaxially grown afterwards, reduces a distribution width of the crystal grain (magnetic grain) sizes, and promotes the in-plane orientation of the c-axis. The in-plane orientation refers to the orientation in a direction parallel to the substrate surface. The nonmagnetic intermediate layer 25 may have a multi-layer structure which is made up of a plurality of layers which are made of the above described alloys and stacked. Therefore, the nonmagnetic intermediate layer 25 improves the orientation of the first magnetic layer 26 and the second magnetic layer 29.

The lattice constant of the nonmagnetic intermediate layer 25 may be made slightly different, that is, a several % different, from the lattice constant of the first magnetic layer 26 or the second magnetic layer 29, so as to generate an internal stress in the in-plane direction at an interface of the nonmagnetic intermediate layer 25 and the first magnetic layer 26 or within the first magnetic layer 26. In this case, it is possible to increase the static coercivity of the first magnetic layer 26.

The first magnetic layer 26 may be made of Co, Ni, Fe, Co alloy, Ni alloy, Fe alloy and the like. It is particularly preferable to use CoCrTa, CoCrPt or alloys thereof for the first magnetic layer 26. The preferable CoCrTa alloy and the CoCrPt alloy may be obtained by adding an element selected from B, Mo, Nb, Ta, W and Cu or an alloy thereof. The first magnetic layer 26 has a thickness in a range of 1 nm to 10 nm, and preferably in a range of 1 nm to 5 nm. The first magnetic layer 26 is epitaxially grown in a (11-20) direction on the nonmagnetic intermediate layer 25, where "(11-20)" denotes ("1" "1" "2 bar" "0"), and the c-axis is orientated in the in-plane direction and the axis of easy magnetization matches the in-plane direction. The first magnetic layer 26 may have a multi-layer structure which is made up of a plurality of layers which are made of the above described alloys and stacked, and the orientation of the first magnetic layer 26 itself or the second magnetic layer 29 can be improved.

The nonmagnetic coupling layer 28 may be made of Ru, Rh, Ir, Ru alloy, Rh alloy, Ir alloy and the like, for example. Rh and Ir have an fcc structure, while Ru has the hcp structure. The lattice constant $\underline{a}$=0.25 nm for the CoCr alloy used for the first magnetic layer 26, while the lattice constant $\underline{a}$=0.27 nm for the Ru used for the nonmagnetic coupling layer 28. Hence, it is preferable to use Ru or Ru alloy for the nonmagnetic coupling layer 28 so as to have the lattice parameter $\underline{a}$ close to that of the first magnetic layer 26. On the other hand, it is preferable to use the Rh or Rh alloy for the nonmagnetic coupling layer 28 in that the thickness of the Rh or Rh alloy which maximizes the exchange-coupling strength between the first magnetic layer 26 and the second magnetic layer 29 is greater than the thickness of the Ru or Ru alloy which maximizes this exchange-coupling strength.

The Ru alloy used for the nonmagnetic coupling layer 28 may preferably be an alloy of Ru and an element selected from Ti, V, Cr, Mn, Fe, Co, Ni, Nb, Mo, Rh, Pd, Ta, W, Re, Os, Ir and Pt or an alloy thereof. It is preferable to use a Ru alloy $Ru_{100-x}Rh_x$ for the nonmagnetic coupling layer 28, where x is greater than 0 at. % and less than or equal to 60 at. %, and x is more preferably greater than 0 at. % and less than or equal to 40 at. %. Further, it is also preferable to use a Ru alloy $Ru_{100-x}Co_x$ for the nonmagnetic coupling layer 28, where x is greater than 0 at. % and less than or equal to 40 at. %. By using such a Ru alloy for the nonmagnetic coupling layer 28, it is possible to expand a thickness range of the nonmagnetic coupling layer 28 which ferromagnetically couples the first magnetic layer 26 and the second magnetic layer 29 towards the thicker side, and to easily control the thickness of the nonmagnetic coupling layer 28.

The Rh alloy used for the nonmagnetic coupling layer 28 may preferably be an alloy of Rh and an element selected from Ti, V, Cr, Mn, Fe, Co, Ni, Cu, Zr, Nb, Mo, Ru, Pd, Ag, Sb, Hf, Ta, W, Re, Os, Ir and Pt or an alloy thereof. The Ir alloy used for the nonmagnetic coupling layer 28 may preferably be an alloy of Ir and an element selected from Al, Ti, V, Cr, Mn, Fe, Co, Ni, Cu, Nb, Mo, Tc, Ru, Rh, Pd, Ta, W, Re and Os or an alloy thereof.

In a case where the Ru is used for the nonmagnetic coupling layer 28, the nonmagnetic coupling layer 28 preferably has a thickness in a range of 0.1 nm to 0.45 nm. In a case where a Ru alloy such as RuCo is used for the nonmagnetic coupling layer 28, the nonmagnetic coupling layer 28 preferably has a thickness in a range of 0.1 nm to 0.95 nm. Hence, it is preferable to appropriately select the thickness range of the nonmagnetic coupling layer 28 depending on the alloy material and the content of the added element within the alloy material used for the nonmagnetic coupling layer 28, so that the first magnetic layer 26 and the second magnetic layer 29 are ferromagnetically coupled satisfactorily. From the point of view of obtaining a large exchange-coupling strength between the first magnetic layer 26 and the second magnetic layer 29, the nonmagnetic coupling layer 28 preferably has a thickness in a range of 0.2 nm to 0.8 nm. Moreover, in a case where $Ru_{80}Co_{20}$ is used for the nonmagnetic coupling layer 28, the nonmagnetic coupling layer 28 preferably has a thickness in a range of 0.2 nm to 0.7 nm.

Therefore, the first magnetic layer 26 and the second magnetic layer 29 are exchange-coupled via the nonmagnetic coupling layer 28, and the magnetizations of the first magnetic layer 26 and the second magnetic layer 29 are ferromagnetically coupled by appropriately selecting the thickness range of the nonmagnetic coupling layer 28 depending on the alloy material and the content of the added element within the alloy material used for the nonmagnetic coupling layer 28. As a result, in the state where no external magnetic field H is applied to the magnetic recording medium 20, the magnetizations of the first magnetic layer 26 and the second magnetic layer 29 are mutually parallel, as described above in conjunction with FIG. 2.

If the nonmagnetic coupling layer 28 is extremely thin, fine pin holes may be formed in the nonmagnetic coupling layer 28 and bond directly to atoms forming the first magnetic layer 26 and the second magnetic layer 29. In such a case, the atoms forming the first magnetic layer 26 and the second magnetic layer 29 are partially exchange-coupled with an extremely large exchange-coupling strength, thereby causing the magnetization direction of the second magnetic layer 29 to switch simultaneously as the switching of the magnetization direction of the first magnetic layer 26. In such a case, the switching of the magnetization directions of the first magnetic layer 26 and the second magnetic layer 29 becomes difficult, and thus, it is preferable that no pin holes are formed in the nonmagnetic coupling layer 28. In other words, it is preferable that the nonmagnetic coupling layer 28 is formed by a continuous layer.

The nonmagnetic coupling layer 28 may be formed by sputtering, vacuum deposition, Chemical Vapor Deposition (CVD) and the like. It is possible to employ an Ion Cluster Beam (ICB) to form the nonmagnetic coupling layer 28 in order to suppress the thickness inconsistency for the entire substrate area. When the ICB is employed, the thickness inconsistency of the nonmagnetic coupling layer 28 is suppressed because the kinetic energy reaching the surface and the amount of deposition can be controlled satisfactorily. Furthermore, by employing the ICB to form the nonmagnetic coupling layer 28, it may be regarded that the minimum thickness of the Ru layer or Ru alloy layer forming the nonmagnetic coupling layer 28 can be controlled to approximately 0.1 nm.

The second magnetic layer 29 may be made of Co, Ni, Fe, Co alloy, Ni alloy, Fe alloy and the like, similarly as in the case of the first magnetic layer 26. It is particularly preferable to use CoCrTa, CoCrPt or alloys thereof for the second magnetic layer 29. The preferable CoCrTa alloy and the CoCrPt alloy may be obtained by adding an element selected from B, Mo, Nb, Ta, W and Cu or an alloy thereof. The second magnetic layer 29 has a thickness in a range of 5 nm to 30 nm. Since the first seed layer 22 to the second magnetic layer 29 of the stacked structure are grown epitaxially, the layers forming the stacked structure including the second magnetic layer 29 have satisfactory crystal properties and satisfactorily controlled crystal grain diameters. Therefore, the magnetic recording medium 20 has a reduced medium noise. The second magnetic layer 29 may have a multi-layer structure which is made up of a plurality of layers which are made of the above described alloys and stacked, and the orientation of the second magnetic layer 29 itself can be improved.

In this embodiment, a static coercivity Hc1 of the first magnetic layer 26 and a static coercivity of the second magnetic layer 29 satisfy a relationship Hc1<Hc2. In addition, a dynamic coercivity Hc1' of the first magnetic layer 26 and a dynamic coercivity Hc2' of the second magnetic layer 29 satisfy a relationship Hc1'<Hc2'. By setting the dynamic coercivity Hc1' of the first magnetic layer 26 lower than the dynamic coercivity Hc2' of the second magnetic layer 29, the magnetization direction of the first magnetic layer 26 switches before the magnetization direction of the second magnetic layer 29, with respect to the switching of the recording magnetic field of the magnetic head, and the magnetization direction of the second magnetic layer 29 switches thereafter due to the recording magnetic field and the exchange field of the first magnetic layer 26. For this reason, the magnetization transition regions in accordance with the switching timing of the recording magnetic field are formed in the second magnetic layer 29, and the NLTS can be reduced. It is preferable that the static coercivity Hc1 and the dynamic coercivity Hc1' of the first magnetic layer 26 are small as much as possible, because the magnetization of the first magnetic layer 26 can be switched to quickly follow the direction switching timing of the recording magnetic field.

In order to satisfy the relationship Hc1'<Hc2' between the dynamic coercivity Hc1' of the first magnetic layer 26 and the dynamic coercivity Hc2' of the second magnetic layer 29, an anisotropic field Hk1 of the first magnetic layer 26 and an anisotropic field Hk2 of the second magnetic layer 29 may be set to satisfy a relationship Hk1<Hk2. The following relationship between the dynamic coercivity Hc' and the anisotropic field Hk is described in H. N. Bertram et al., J. Appl. Phys., vol. 85, No. 8, pp. 4991 (1999), where $f_o$ denotes an attempt frequency, $K_u$ denotes an anisotropy constant, V denotes a volume of a magnetic unit, $k_B$ denotes the Boltzmann's constant, and T denotes the absolute temperature.

$$Hc'=0.474Hk[1-1.55\{(k_BT/K_uV)\times\ln(f_o t/\ln 2)/2\}]^{2/3}$$

Hence, it may be regarded that the magnetic field switching time $t=10^{-9}/\ln 2$ seconds and the anisotropic field Hk and the dynamic coercivity Hc' are proportional. For this reason, by setting the first magnetic layer 26 and the second magnetic layer 29 to satisfy the relationship Hk1<Hk2, the first magnetic layer 26 and the second magnetic layer 29 can be set to satisfy the relationship Hc1'<Hc2'.

On the other hand, in order to satisfy the relationship Hc1'<Hc2' between the dynamic coercivity Hc1' of the first magnetic layer 26 and the dynamic coercivity Hc2' of the second magnetic layer 29, the Pt content of the second magnetic layer 29 is set larger than the Pt content of the first magnetic layer 26 when the CoCrPt alloy is used for the first magnetic layer 26 and the second magnetic layer 29. For example, in a case where the first magnetic layer 26 and the second magnetic layer 29 are made of CoCrPtB, the Pt content of the first magnetic layer 26 is set smaller than that of the second magnetic layer 29. In other words, the first magnetic layer 26 is made of $CoCrPt_9B$, and the second magnetic layer 29 is made to $CoCrPt_{12}B$, where the numerals affixed to Pt denotes the Pt content within the alloy in atomic %. Of course, the first magnetic layer 26 in this case may be made of an alloy which does not include Pt. The alloy which does not include Pt may be CoCr or CoCr alloys such as CoCrB. Hence, by setting the composition, namely, the Pt content in this case, of the first magnetic layer 26 and the second magnetic layer 29, the first magnetic layer 26 and the second magnetic layer 29 can be set to satisfy the relationship Hc1'<Hc2'.

For example, when the first magnetic layer 26 is made of an alloy containing CoCr or CoCrPt as the main component, the second magnetic layer 29 may be made of an alloy containing CoCrPt as the main component, and a Pt content in at. % of the first magnetic layer 26 is set lower than that of the second magnetic layer 29.

In a case where the first magnetic layer 26 is extremely thin and the thickness is 1 nm to 2 nm, for example, the anisotropic field Hk1 decreases compared to a case where the thickness is 5 nm, for example. Hence, in such a case where the first magnetic layer 26 is extremely thin, the Pt content of the alloy forming the first magnetic layer 26 may be selected within a range such that the relationship Hk1<Hk2 is satisfied between the first magnetic layer 26 and the second magnetic layer 29.

It is preferable that a saturation magnetization Ms1 and a thickness t1 of the first magnetic layer 26 and a saturation magnetization Ms2 and a thickness t2 of the second magnetic layer 29 satisfy the following relationship. In other words, it is preferable that a ratio (Ms2×t2)/(Ms1×t1) of the saturation magnetization and thickness product (Ms2×t2) of the second magnetic layer 29 and the saturation magnetization and thickness product (Ms1×t1) of the first magnetic layer 26 is in a range of 1 to 10.

$$(Ms2\times t2)/(Ms1\times t1)=1 \text{ to } 10$$

The protection layer 30 may be made of diamond-like carbon, carbon nitride, amorphous carbon and the like. The protection layer 30 has a thickness in a range of 0.5 nm to 10 nm, and preferably in a range of 0.5 nm to 5 nm.

The lubricant layer 31 may be made of an organic liquid lubricant having perfluoropolyether as a main chain and —OH, benzene ring or the like as the terminal functional group. More particularly, ZDol manufactured by Monte Fluos (terminal functional group: —OH), AM3001 manufactured by Ausimonoto (terminal functional group: benzene ring), Z25 manufactured by Monte Fluos, and the like, with a thickness in a range of 0.5 nm to 3.0 nm, may be used for the lubricant layer 31. The lubricant may be appropriately selected depending on the material used for the protection layer 30.

The layers 22 through 26 and 28 through 30 may be successively formed on the substrate 21 by sputtering, vacuum deposition and the like. On the other hand, the lubricant layer 31 may be formed by dipping, spin-coating and the like. In a case where the magnetic recording medium 20 has a tape-shape, the lubricant layer 31 may be formed by die-coating.

Although the first magnetic layer 26 is arranged closer to the substrate 21 than the second magnetic layer 29 in FIG. 14, the positions of the first magnetic layer 26 and the second magnetic layer 29 may be interchanged, so that the second magnetic layer 29 is arranged closer to the substrate 21 than the first magnetic layer 26.

Next, a description will be given of a case where this embodiment is applied to the magnetic disk. First, a CrTi first seed layer 22 having a thickness of 25 nm was formed on a glass substrate 21. An AlRu alloy second seed layer 23 having a thickness of 25 nm, a CrW alloy underlayer 24 having a thickness of 4.5 nm, a $Co_{84}C_{16}$ alloy first magnetic layer 26 having a thickness of 1.8 nm, a Ru nonmagnetic coupling layer 28, a $CoCr_{20}Pt_{11}B_8$ alloy second magnetic layer 29 having a thickness of 15.2 nm, and a diamond-like carbon protection layer 30 having a thickness of 4.5 nm were successively formed on the CrTi first seed layer 22. The nonmagnetic intermediate layer 25 was omitted in this particular case. The layers 22 through 24, 26, and 28 through 30 were formed by use of a DC magnetron sputtering apparatus. A lubricant layer 31 was formed by AM3001 manufactured by Ausimonoto (terminal functional group: benzene ring) to a thickness of 1.5 nm on the diamond-like carbon protection layer 30 by dipping. Various first magnetic disks were produced by varying the thickness of the Ru nonmagnetic coupling layer 28 in a range of 0.4 nm to 1.0 nm.

Next, each first magnetic disk was set on a spin stand to measure the overwrite performance and the NLTS performance by a composite magnetic head. In addition, the static coercivity (coercivity in the in-plane direction with respect to the substrate 21) and the remanent magnetization and thickness product were measured using a Vibration Sample Magnetometer (VSM) and a Kerr effect measuring device.

Figure 15:
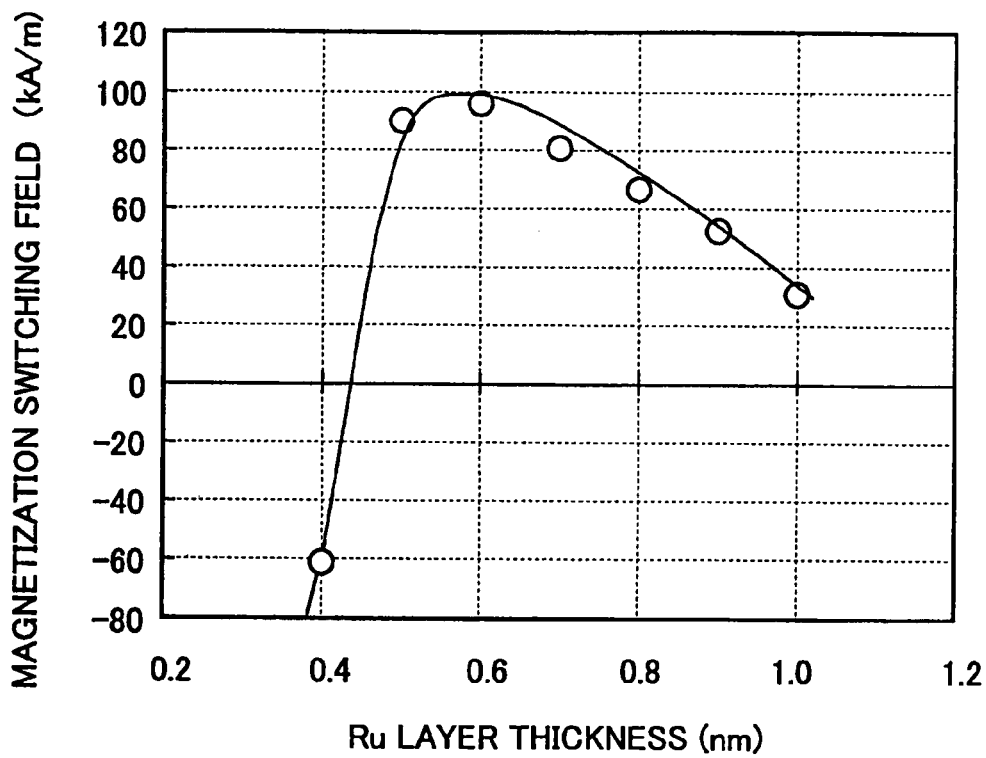
FIG. 15 is a diagram showing a relationship of a magnetization switching field of a first magnetic layer and a Ru layer thickness of first magnetic disks.

FIG. 15 is a diagram showing a relationship of a magnetization switching field of the $Co_{84}C_{16}$ alloy first magnetic layer 26 and the thickness of the Ru nonmagnetic coupling layer 28 of the first magnetic disks in accordance with the first embodiment of the magnetic recording medium. In FIG. 15, the ordinate indicates the magnetic switching field (kA/m), and the abscissa indicates the Ru layer thickness (nm). The magnetization switching field of the $Co_{84}C_{16}$ alloy first magnetic layer 26 was obtained from the static magnetic characteristic measured by the VSM. When the magnetization switching field indicates a negative value, the magnetization directions of the first magnetic layer 26 (11) and the second magnetic layer 29 (12) are mutually parallel in the remanent magnetization state, as indicated by the static magnetic characteristic shown in FIG. 2. On the other hand, when the magnetization switching field indicates a positive value, the magnetization directions of the first magnetic layer 26 (11) and the second magnetic layer 29 (12) are mutually antiparallel.

As may be seen from FIG. 15, the magnetization switching field takes a negative value when the thickness of the Ru nonmagnetic coupling layer 28 is 0.4 nm or less. Accordingly, it may be seen that the $Co_{84}C_{16}$ alloy first magnetic layer 26 and the $CoCr_{20}Pt_{11}B_8$ alloy second magnetic layer 29 are ferromagnetically coupled and the magnetization directions thereof are mutually parallel for the Ru layer thickness range greater than 0 and less than or equal to 0.4 nm. On the other hand, the magnetization switching field takes a positive value when the thickness of the Ru nonmagnetic coupling layer 28 is in a range of 0.5 nm to 1.0 nm, and the $Co_{84}C_{16}$ alloy first magnetic layer 26 and the $CoCr_{20}Pt_{11}B_8$ alloy second magnetic layer 29 are antiferromagnetically coupled and mutually antiparallel for this Ru layer thickness range.

Figure 16:
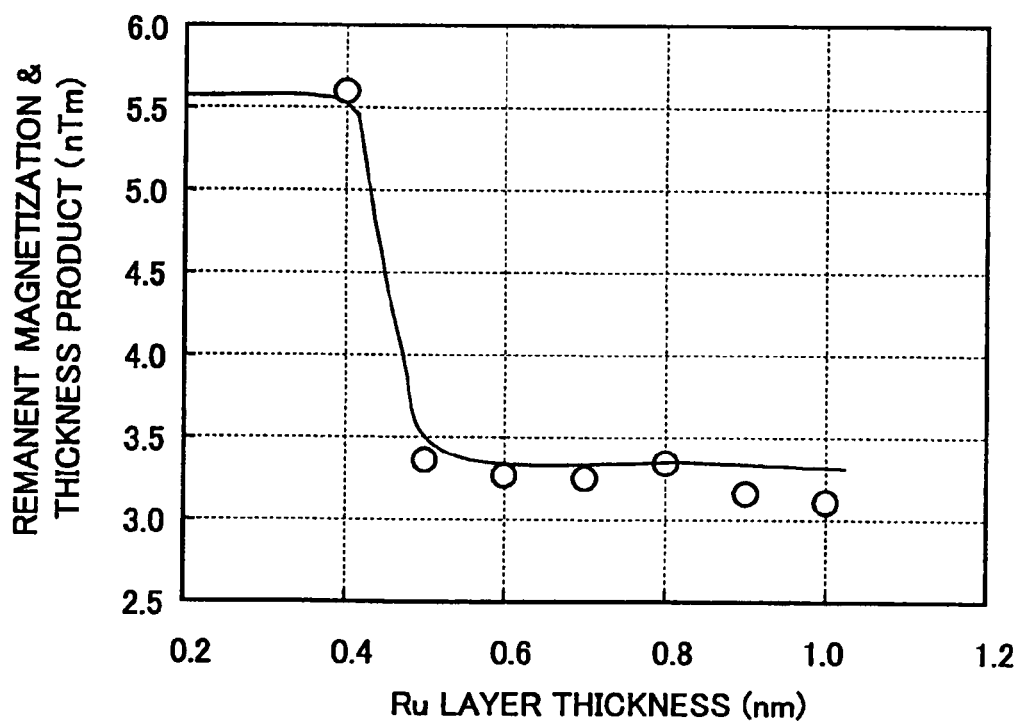
FIG. 16 is a diagram showing a relationship of a remanent magnetization and thickness product (Mrt value) and the Ru layer thickness of the first magnetic disks.

FIG. 16 is a diagram showing a relationship of a remanent magnetization and thickness product (Mrt value) and the thickness of the Ru nonmagnetic coupling layer 28 of the first magnetic disks in accordance with the first embodiment of the magnetic recording medium. In FIG. 16, the ordinate indicates the remanent magnetization and thickness product (nTm), and the abscissa indicates the Ru layer thickness (nm). The remanent magnetization and thickness product was obtained by dividing a remanent magnetic flux density measured by the VSM by a sum of the thicknesses of the $Co_{84}C_{16}$ alloy first magnetic layer 26 and the $CoCr_{20}Pt_{11}B_8$ alloy second magnetic layer 29.

As may be seen from FIG. 16, the remanent magnetization and thickness product sharply increases to a large value when the thickness of the Ru nonmagnetic coupling layer 28 is 0.5 nm or less. Accordingly, it may be seen that the $Co_{84}C_{16}$ alloy first magnetic layer 26 and the $CoCr_{20}Pt_{11}B_8$ alloy second magnetic layer 29 are ferromagnetically coupled and the magnetization directions thereof are mutually parallel for the Ru layer thickness range greater than 0 and less than or equal to 0.5 nm.

Figure 17:
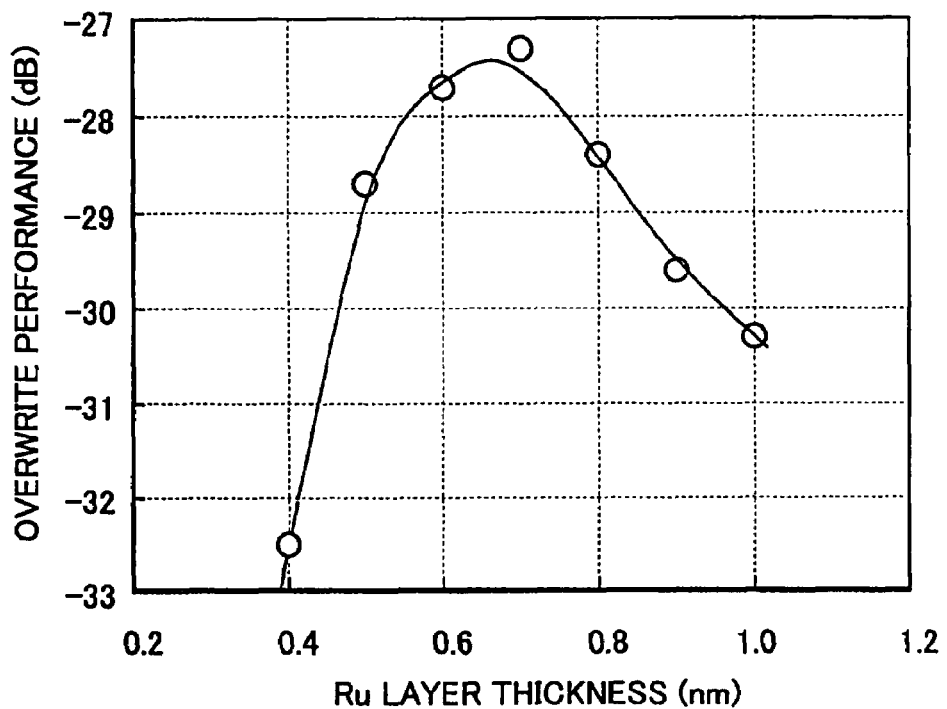
FIG. 17 is a diagram showing a relationship of an overwrite performance and the Ru layer thickness of the first magnetic disks.

FIG. 17 is a diagram showing a relationship of an overwrite performance and the thickness of the Ru nonmagnetic coupling layer 28 of the first magnetic disks in accordance with the first embodiment of the magnetic recording medium. In FIG. 17, the ordinate indicates the overwrite performance (dB), and the abscissa indicates the Ru layer thickness (nm).

As may be seen from FIG. 17, the overwrite performance of the first magnetic disk having the Ru nonmagnetic coupling layer 28 with the thickness of 0.4 nm so that the $Co_{84}C_{16}$ alloy first magnetic layer 26 and the $CoCr_{20}Pt_{11}B_8$ alloy second magnetic layer 29 are ferromagnetically coupled and the magnetization directions thereof are mutually parallel, is greatly improved compared to those of the first magnetic disks having the Ru nonmagnetic coupling layer 28 with the thickness in a range of 0.5 nm to 1.0 nm so that the $Co_{84}C_{16}$ alloy first magnetic layer 26 and the $CoCr_{20}Pt_{11}B_8$ alloy second magnetic layer 29 are antiferromagnetically coupled and mutually antiparallel.

Figure 18:
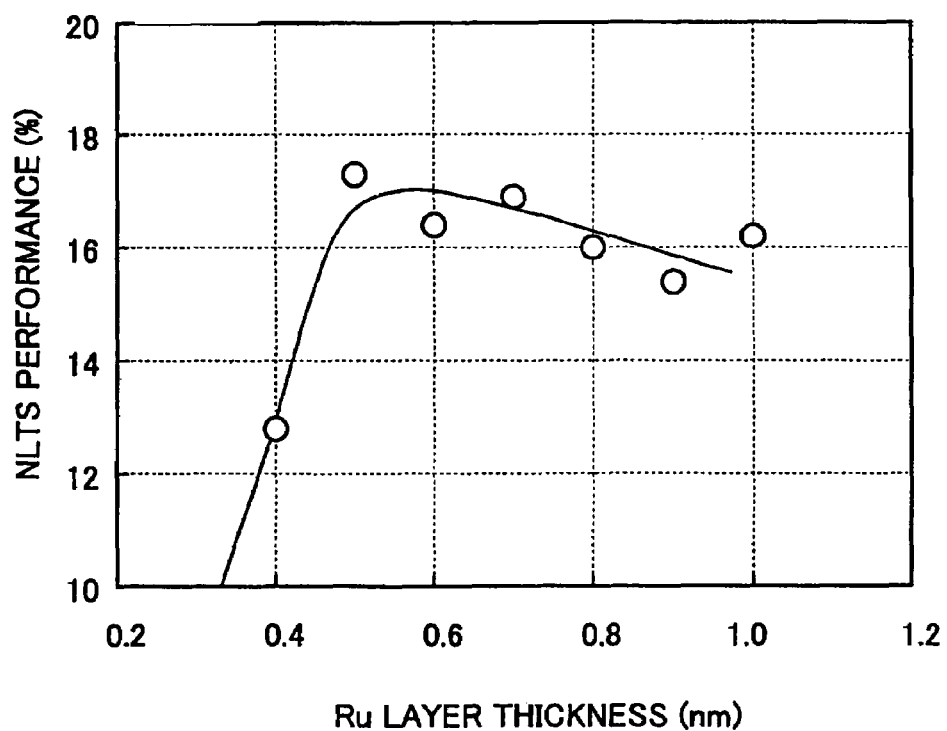
FIG. 18 is a diagram showing a relationship of an NLTS performance and the Ru layer thickness of the first magnetic disks.

FIG. 18 is a diagram showing a relationship of an NLTS performance and the thickness of the Ru nonmagnetic coupling layer 28 of the first magnetic disks in accordance with the first embodiment of the magnetic recording medium. In FIG. 18, the ordinate indicates the NLTS performance (%), and the abscissa indicates the Ru layer thickness (nm).

As may be seen from FIG. 18, the NLTS performance of the first magnetic disk having the Ru nonmagnetic coupling layer 28 with the thickness of 0.4 nm so that the $Co_{84}C_{16}$ alloy first magnetic layer 26 and the $CoCr_{20}Pt_{11}B_8$ alloy second magnetic layer 29 are ferromagnetically coupled and the magnetization directions thereof are mutually parallel, is greatly improved compared to those of the first magnetic disks having the Ru nonmagnetic coupling layer 28 with the thickness in a range of 0.5 nm to 1.0 nm so that the $Co_{84}C_{16}$ alloy first magnetic layer 26 and the $CoCr_{20}Pt_{11}B_8$ alloy second magnetic layer 29 are antiferromagnetically coupled and mutually antiparallel.

As may be seen from FIGS. 15 through 18, the $Co_{84}C_{16}$ alloy first magnetic layer 26 and the $CoCr_{20}Pt_{11}B_8$ alloy second magnetic layer 29 are ferromagnetically coupled and the magnetization directions thereof are mutually parallel when the thickness of the Ru nonmagnetic coupling layer 28 is less than 0.5 nm. It was found from curves connecting the measured values, particularly from the measured values in FIG. 15, that the thickness of the Ru nonmagnetic coupling layer 28 is preferably 0.45 nm or less, in order to obtain the ferromagnetic-coupling and the mutually parallel magnetizations of the $Co_{84}C_{16}$ alloy first magnetic layer 26 and the $CoCr_{20}Pt_{11}B_8$ alloy second magnetic layer 29. Furthermore, from the tendencies of the curves shown in FIGS. 15 through 18 and the fact that the $Co_{84}Cr_{16}$ alloy first magnetic layer 26 and the $CoCr_{20}Pt_{11}B_8$ alloy second magnetic layer 29 become ferromagnetically coupled and the magnetization directions thereof become mutually parallel when the Ru nonmagnetic coupling layer 28 is thin, it may be regarded that the thickness of the Ru nonmagnetic coupling layer 28 may be thin on the order of approximately 0.1 nm. In other words, it was found that the overwrite performance and the NLTS performance are satisfactory, and the write performances are satisfactory, when the thickness of the Ru nonmagnetic coupling layer 28 is in a range of approximately 0.1 nm to approximately 0.45 nm.

Next, a description will be given of another case where this embodiment is applied to the magnetic disk. Various second magnetic disks were produced similarly to the above described case, except that the first magnetic layer 26 is made of a $Co_{84}C_{16}$ alloy and has a thickness of 3.0 nm, the second magnetic layer 29 is made of a $CoCr_{20}Pt_{11}B_8$ alloy and has a thickness of 20.0 nm, and the nonmagnetic coupling layer 28 is made of $RuCo_{20}$ and has a thickness which is varied in a range of 0.2 nm to 1.4 nm. Otherwise, the second magnetic disks were the same as the first magnetic disks described above.

Figure 19:
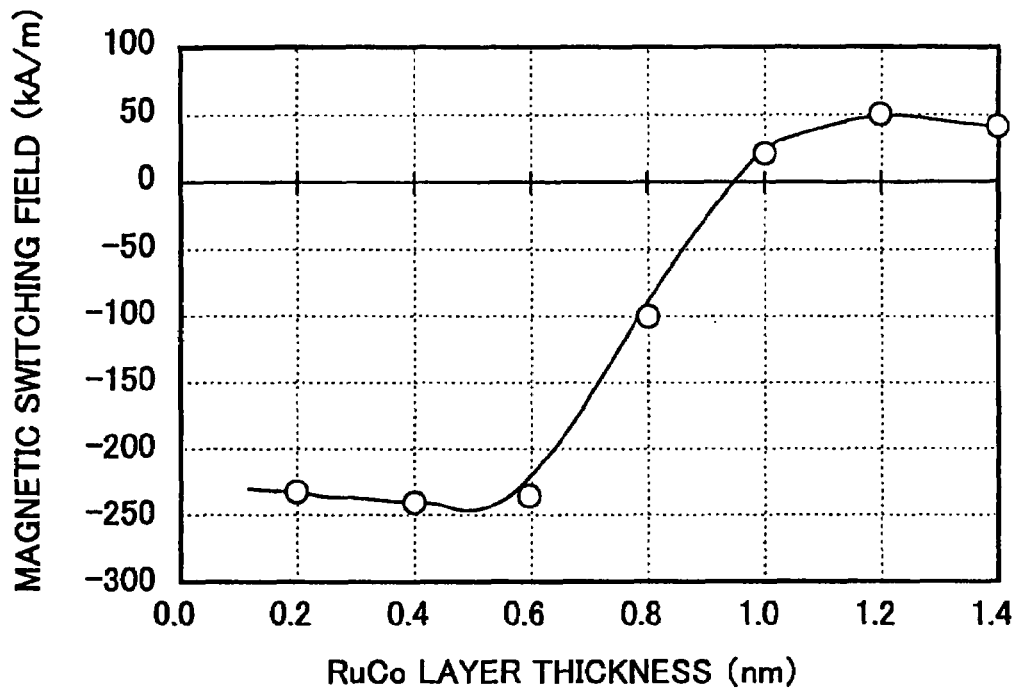
FIG. 19 is a diagram showing a relationship of a magnetization switching field of a first magnetic layer and a RuCo layer thickness of second magnetic disks.

FIG. 19 is a diagram showing a relationship of a magnetization switching field of a first magnetic layer and a thickness of the RuCo nonmagnetic coupling layer 28 of second magnetic disks in accordance with the first embodiment of the magnetic recording medium. In FIG. 19, the ordinate indicates the magnetization switching field (kA/m), and the abscissa indicates the RuCo layer thickness (nm).

As may be seen from FIG. 19, the magnetization switching field takes a negative value when the RuCo nonmagnetic coupling layer 28 has a thickness in a range of 0.2 nm to 0.8 nm, and takes a positive value when the RuCo nonmagnetic coupling layer 28 has a thickness in a range of 1.0 nm to 1.4 nm. Hence, the $Co_{84}C_{16}$ alloy first magnetic layer 26 and the $CoCr_{20}Pt_{11}B_8$ alloy second magnetic layer 29 are ferromagnetically coupled and the magnetization directions thereof are mutually parallel when the RuCo nonmagnetic coupling layer 28 has the thickness in the range of 0.2 nm to 0.8 nm. Compared to the case shown in FIG. 15 where the first and second magnetic layers 26 and 29 are ferromagnetically coupled when the thickness of the Ru nonmagnetic coupling layer 28 is 0.4 nm or less, it may be seen from FIG. 19 that the ferromagnetic coupling of the first and second magnetic layers 26 and 29 can be obtained at a larger thickness of the RuCo nonmagnetic coupling layer 26. In other words, the ferromagnetic coupling of the first and second magnetic layers 26 and 29 can be obtained within the thickness range of the RuCo nonmagnetic coupling layer 28 which is expanded towards the thicker side. Since the RuCo nonmagnetic coupling layer 28 may be made thick compared to the Ru nonmagnetic coupling layer 28, it is easier to control the thickness of the RuCo nonmagnetic coupling layer 28. Furthermore, the thickness range of the RuCo nonmagnetic coupling layer 28 may be expanded to 0.1 nm to 0.8 nm, similarly as described above for the first magnetic disks, and still achieve the ferromagnetic coupling of the $Co_{84}C_{16}$ alloy first magnetic layer 26 and the $CoCr_{20}Pt_{11}B_8$ alloy second magnetic layer 29 and make the magnetization directions thereof mutually parallel.

Figure 20:
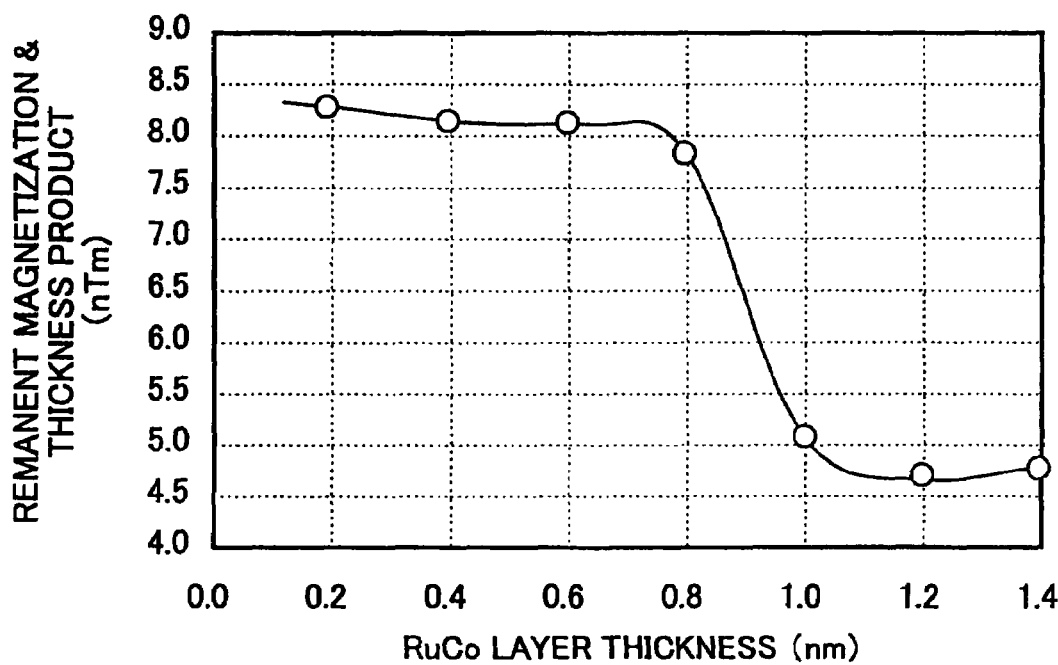
FIG. 20 is a diagram showing a relationship of a remanent magnetization and thickness product (Mrt value) and the RuCo layer thickness of the second magnetic disks.

FIG. 20 is a diagram showing a relationship of a remanent magnetization and thickness product (Mrt value) and the thickness of the RuCo nonmagnetic coupling layer 28 of the second magnetic disks in accordance with the first embodiment of the magnetic recording medium. In FIG. 20, the ordinate indicates the remanent magnetization and thickness product (nTm), and the abscissa indicates the RuCo layer thickness (nm).

As may be seen from FIG. 20, the remanent magnetization and thickness product increases when the RuCo nonmagnetic coupling layer 28 has the thickness in the range of 0.2 nm to 0.8 nm, compared to when the RuCo nonmagnetic coupling layer 28 has the thickness in the range of 1.0 nm to 1.4 nm. In addition, the remanent magnetization and thickness product is approximately constant when the RuCo nonmagnetic coupling layer 28 has the thickness in the range of 0.2 nm to 0.8 nm. Accordingly, it may be seen that the $Co_{84}C_{16}$ alloy first magnetic layer 26 and the $CoCr_{20}Pt_{11}B_8$ alloy second magnetic layer 29 are ferromagnetically coupled and the magnetization directions thereof are mutually parallel when the RuCo nonmagnetic coupling layer 28 has the thickness in the range of 0.2 nm to 0.8 nm.

Therefore, by using the RuCo nonmagnetic coupling layer 28, it is possible to expand the thickness range in which the ferromagnetic coupling of the first and second magnetic layers 26 and 29 are obtained, towards the thicker side. For this reason, it becomes easier to control the thickness of the nonmagnetic coupling layer 28.

Second Embodiment

Figure 21:
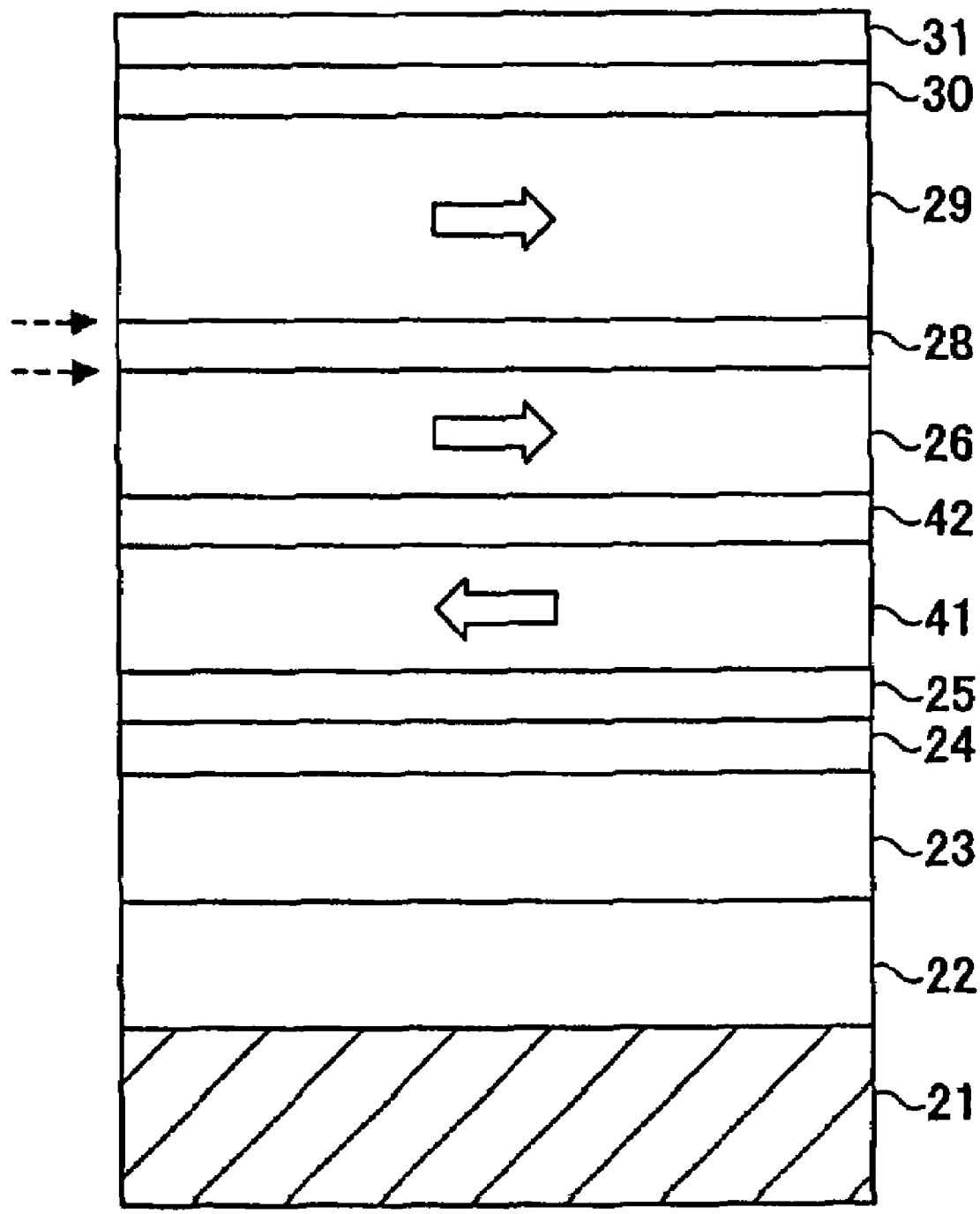
FIG. 21 is a cross sectional view showing a part of a second embodiment of the magnetic recording medium according to the present invention.

FIG. 21 is a cross sectional view showing a part of a second embodiment of the magnetic recording medium according to the present invention. In FIG. 21, those parts which are essentially the same as those corresponding parts in FIG. 14 are designated by the same reference numerals, and a description thereof will be omitted.

In a magnetic recording medium 40 shown in FIG. 21, a stacked structure provided on the substrate 21 additionally includes a ferromagnetic layer 41 and a first nonmagnetic coupling layer 42, in addition to the layers shown in FIG. 14. The ferromagnetic layer 41 is provided on the nonmagnetic intermediate layer 25. A second nonmagnetic coupling layer 28 is provided on the first magnetic layer 26. Hence, the ferromagnetic layer 41 is antiferromagnetically coupled to the first magnetic layer 26 via the first nonmagnetic coupling layer 42.

The ferromagnetic layer 41 may be made of Co, Ni, Fe, Co alloy, Ni alloy, Fe alloy and the like. It is particularly preferable to use CoCrTa, CoCrPt or alloys thereof for the ferromagnetic layer 41. The preferable CoCrTa alloy and the CoCrPt alloy may be obtained by adding an element selected from B, Mo, Nb, Ta, W and Cu or an alloy thereof. The ferromagnetic layer 41 has a thickness in a range of 1 nm to 10 nm. The ferromagnetic layer 41 is epitaxially grown in a (11-20) direction on the nonmagnetic intermediate layer 25, where "(11-20)" denotes ("1" "1" "2 bar" "0"), and the c-axis is orientated in the in-plane direction and the axis of easy magnetization matches the in-plane direction. The ferromagnetic layer 41 may have a multi-layer structure which is made up of a plurality of layers which are made of the above described alloys and stacked. In other words, a plurality of ferromagnetic layers 41 may be provided.

The first nonmagnetic coupling layer 42 may be made of a material similar to that used for the nonmagnetic coupling layer 28 of the first embodiment described above, such as Ru, Rh, Ir, Ru alloy, Rh alloy, Ir alloy and the like. The thickness of the first nonmagnetic coupling layer 42 is set in a range of 0.5 nm to 1.5 nm. When the first nonmagnetic coupling layer 42 is made of Ru, the thickness is preferably set in a range of 0.6 nm to 0.9 nm. When the first nonmagnetic coupling layer 42 is made of an Ru alloy, the thickness is preferably set in a range of 1.0 nm to 1.5 nm, although the thickness may depend on the composition of the Ru alloy. Since the thickness range of the first nonmagnetic coupling layer 42 can be expanded towards the thicker side when the Ru alloy is used therefor, it becomes easier to control the conditions for forming the first nonmagnetic coupling layer 42.

In the magnetic recording medium 40 of this embodiment, it is preferable that a dynamic coercivity Hc3' of the ferromagnetic layer 41, the dynamic coercivity Hc1' of the first magnetic layer 26 and the dynamic coercivity Hc2' of the second magnetic layer 29 satisfy a relationship Hc1'<Hc3' or Hc2'<Hc3'.

It is also preferable that a saturation magnetization Ms1 and a thickness t1 of the first magnetic layer 26, a saturation magnetization Ms2 and a thickness t2 of the second magnetic layer 29, and a saturation magnetization Ms3 and a thickness t3 of the ferromagnetic layer 41 satisfy a relationship (Ms3×t3)<(Ms1×t1+Ms2×t2).

Similarly to the magnetic recording medium 20 of the first embodiment, when the direction of the recording magnetic field from the magnetic head is switched with respect to the magnetic recording medium 40, the magnetization direction of the first magnetic layer 26 switches first and becomes the same as the direction of the recording magnetic field, and then, the exchange field from the first magnetic layer 26 is applied to the second magnetic layer 29 in the same direction as the recording magnetic field to switch the magnetization direction of the second magnetic layer 29. The magnetization direction of the ferromagnetic layer 41 is switched by the exchange field from the first magnetic layer 26 after the magnetic head moves further away and the recording magnetic field decreases, and the magnetization direction of the ferromagnetic layer 41 becomes antiparallel to the magnetization direction of the first magnetic layer 26 as shown in FIG. 21.

The magnetic recording medium 40 of this embodiment has satisfactory write performances, similarly to the magnetic recording medium 20 of the first embodiment described above. In addition, because the ferromagnetic layer 41 is exchange-coupled to the first magnetic layer 26, it is possible to increase a volume occupied by one recording unit, to thereby improve the thermal stability. Moreover, since the magnetization direction of the ferromagnetic layer 41 is antiparallel to the magnetizations of the first magnetic layer 26 and the second magnetic layer 29, it is possible to weaken the static magnetic mutual interaction of adjacent bits and to appropriately adjust the reproduced output of the magnetic head.

Modification Of Second Embodiment

Figure 22:
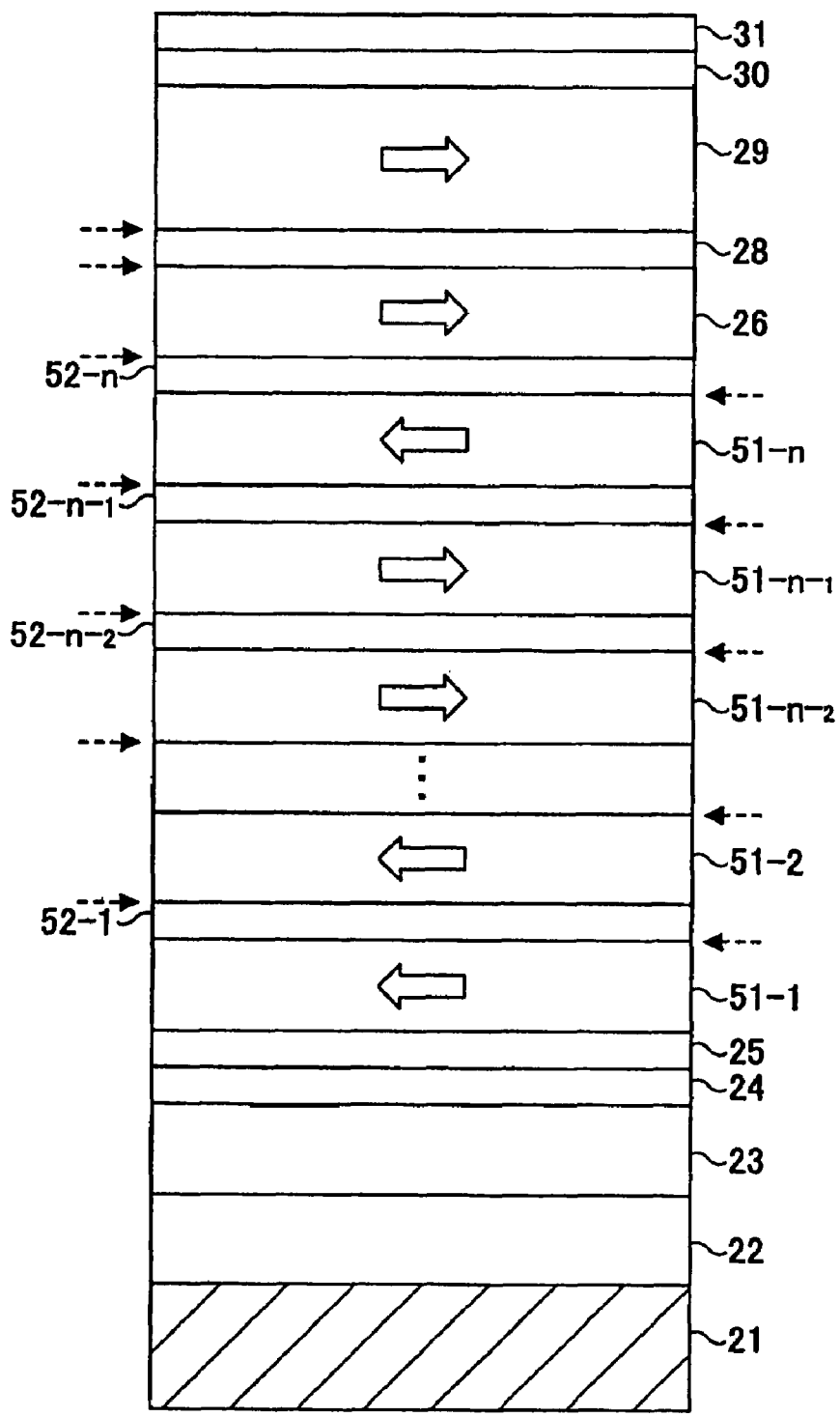
FIG. 22 is a cross sectional view showing a part of a modification of the second embodiment of the magnetic recording medium.

FIG. 22 is a cross sectional view showing a part of a modification of the second embodiment of the magnetic recording medium. In FIG. 22, those parts which are essentially the same as those corresponding parts in FIGS. 14 and 21 are designated by the same reference numerals, and a description thereof will be omitted.

In a magnetic recording medium 50 shown in FIG. 22, a stacked structure, that is, an exchange layer structure, made up of ferromagnetic layers 51-1 through 51-$n$ and nonmagnetic coupling layers 52-1 through 52-$n$ is provided between the nonmagnetic intermediate layer 25 and the first magnetic layer 26. In this stacked structure, a ferromagnetic layer 51-$i$ and a nonmagnetic coupling layer 52-$i$ are alternately stacked, where i=1 to n.

Each of the ferromagnetic layers 51-1 through 51-$n$ may be formed similarly to the ferromagnetic layer 41 of the magnetic recording medium 40 of the second embodiment described above. Each of the nonmagnetic coupling layers 52-1 through 52-$n$ may be made of a material similar to that used for the nonmagnetic coupling layer 42 or 28 of the magnetic recording medium 40 of the second embodiment described above, such as Ru, Rh, Ir, Ru alloy, Rh alloy, Ir alloy and the like. A total thickness of the nonmagnetic coupling layers 52-1 through 52-$n$ is preferably set in a range of 3 nm to 100 nm, and more preferably in a range of 3 nm to 50 nm, since the write performances tend to deteriorate when the total thickness exceeds 100 nm.

For example, when the nonmagnetic coupling layer 52-$n$-2 is formed similarly to the second nonmagnetic coupling layer 28 of the magnetic recording medium 40 of the second embodiment, the ferromagnetic layers 51-$n$-2 and 51-$n$-1 are ferromagnetically exchange-coupled via the nonmagnetic coupling layer 52-$n$-2 as shown in FIG. 22. In FIG. 22, the ferromagnetic layers 51-$n$-1 and 51-$n$ are antiferromagnetically exchange-coupled via the nonmagnetic coupling layer 52-$n$-1.

In other words, in this modification of the second embodiment, the material, thickness and the like of each nonmagnetic coupling layer 52 are appropriately selected so that the ferromagnetic layers 51 sandwiching the nonmagnetic coupling layer 52 are ferromagnetically or antiferromagnetically exchange-coupled and the magnetizations of the ferromagnetic layers 51-$n$-2 and 51-$n$-1 become parallel to the magnetization of the second magnetic layer 29. As a result, the switching mechanism of the magnetization directions of the ferromagnetic layers 51-$n$-2 and 51-$n$-1 becomes similar to the switching mechanism of the magnetization directions of the first magnetic layer 26 and the second magnetic layer 29. That is, with respect to the switching of the direction of the recording magnetic field, the magnetization direction of the lower ferromagnetic layer 51-$n$-2 switches first, and the magnetization direction of the upper ferromagnetic layer 51-$n$-1 is switched thereafter due to the recording magnetic field which is increased due to the exchange field from the lower ferromagnetic layer 51-$n$-2. Consequently, the write performances with respect to the ferromagnetic layers 51-$n$-2 and 51-$n$-1 improve, and the write performances of the magnetic recording medium 50 is further improved. Of course, the position of the lower ferromagnetic layer 51-$n$-2 and the upper ferromagnetic layer 51-$n$-1 in the stacked structure may be interchanged so that the order in which the magnetization directions of the ferromagnetic layers 51-$n$-2 and 51-$n$-1 are switched is reversed.

According to the magnetic recording medium 50 of this modification of the second embodiment, it is possible to further improve the thermal stability by increasing the number of exchange-coupled ferromagnetic layers forming the stacked structure on the substrate 21 (nonmagnetic intermediate layer 25 in FIG. 22). Furthermore, it is possible to weaken the static magnetic interaction of the adjacent bits, and appropriately adjust the reproduced output of the magnetic head.

Although the first magnetic layer 26 is arranged closer to the substrate 21 than the second magnetic layer 29 in FIGS. 21 and 22, the positions of the first magnetic layer 26 and the second magnetic layer 29 may be interchanged, so that the second magnetic layer 29 is arranged closer to the substrate 21 than the first magnetic layer 26.

Moreover, in each of the magnetic recording media 20, 40 and 50 shown in FIGS. 14, 21 and 22, a magnetic bonding layer made of a ferromagnetic material may be provided between the first magnetic layer 26 and the nonmagnetic coupling layer 28 and/or between the nonmagnetic coupling layer 28 and the second magnetic layer 29, to adjust the magnitude of the exchange-coupling. In addition, it is also possible to further provide such a magnetic bonding layer between the ferromagnetic layer and the nonmagnetic coupling layer which are adjacent, of the ferromagnetic layers 51-1 through 51-$n$ and the nonmagnetic coupling layers 52-1 through 52-$n$ which form the stacked structure under the first magnetic layer 26 in FIG. 22, to adjust the magnitude of the exchange-coupling. In FIGS. 14, 21 and 22, a dotted arrow indicates a position where such a magnetic bonding layer may be provided.

When the magnetic bonding layer is provided between the first magnetic layer 26 and the nonmagnetic coupling layer 28, the magnetic bonding layer and the second magnetic layer 29 are exchange-coupled, and the magnetization directions of the magnetic bonding layer and the second magnetic layer are mutually parallel in a state where no external magnetic field is applied to the magnetic recording medium.

Similarly, when the magnetic bonding layer is provided between the nonmagnetic coupling layer 28 and the second magnetic layer 29, the first magnetic layer 26 and the magnetic bonding layer are exchange-coupled, and the magnetization directions of the first magnetic layer 26 and the magnetic bonding layer are mutually parallel in a state where no external magnetic field is applied to the magnetic recording medium.

Embodiment of Magnetic Storage Apparatus

Figure 23:
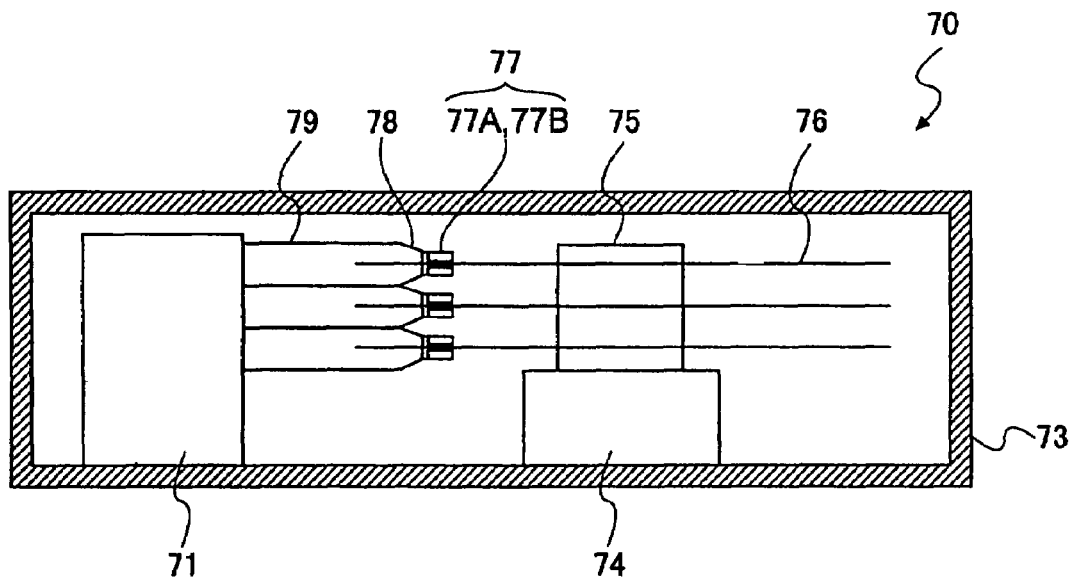
FIG. 23 is a cross sectional view showing a part of a magnetic storage apparatus according to the present invention.
Figure 24:
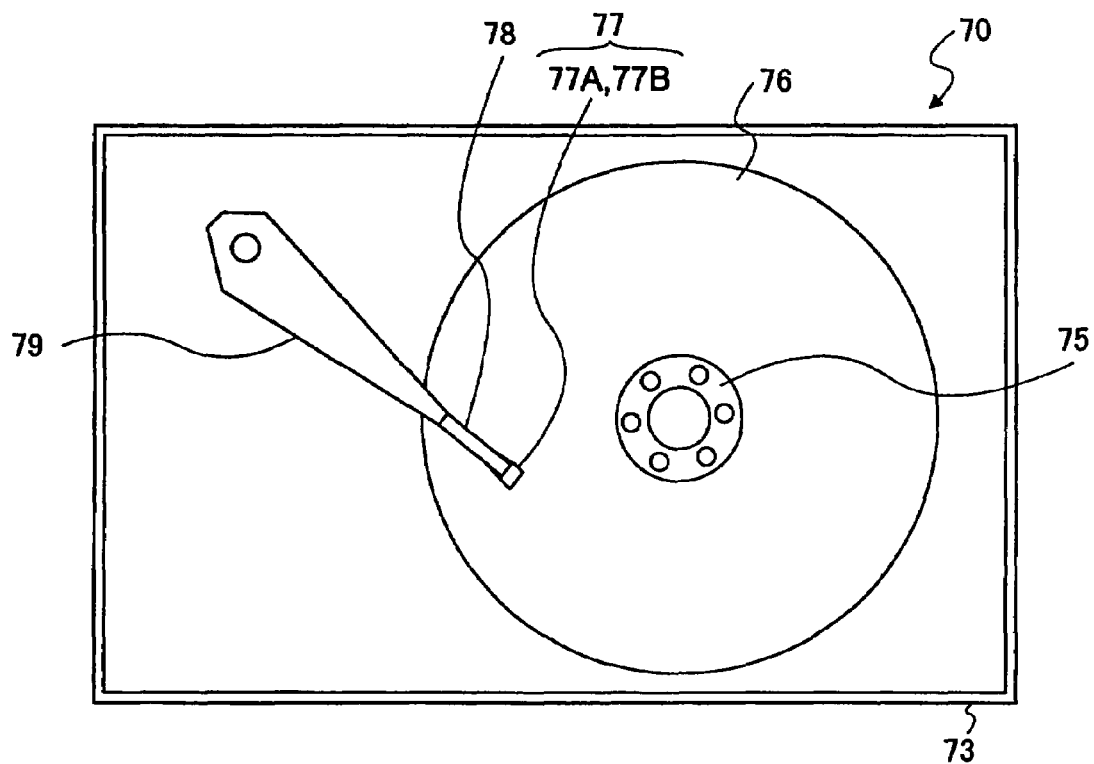
FIG. 24 is a plan view showing a part of the magnetic storage apparatus shown in FIG. 23.

Next, a description will be given of an embodiment of a magnetic storage apparatus according to the present invention, by referring to FIGS. 23 and 24. FIG. 23 is a cross sectional view showing a part of this embodiment of the magnetic storage apparatus, and FIG. 24 is a plan view showing a part of this embodiment of the magnetic storage apparatus shown in FIG. 23. This embodiment of the magnetic storage apparatus employs an embodiment of a recording method according to the present invention, to record information on any of the embodiments and modifications of the magnetic recording medium described above.

As shown in FIGS. 23 and 24, a magnetic storage apparatus 70 generally includes a housing 73. A motor 74, a hub 75, a plurality of magnetic recording media 76, a plurality of recording and reproducing heads (composite heads) 77, a plurality of suspensions 78, a plurality of arms 79, and an actuator unit 71 are provided within the housing 73. The magnetic recording media 76 are mounted on the hub 75 which is rotated by the motor 74. The recording and reproducing head 77 is made up of a reproducing head 77A and a recording head 77B. For example an Magneto-Resistive (MR) element, a Giant Magneto-Resistive (GMR) element, a Tunneling Magneto-Resistive (TMR) element, a Current Perpendicular to Plane (CPP) element and the like may be used as the reproducing head 77A. On the other hand, an inductive head such as a thin film head may be used for the recording head 77B. Each recording and reproducing head 77 is mounted on the tip end of a corresponding part 79 via the suspension 78. The arms 79 are moved by the actuator unit 71. The basic construction of this magnetic storage apparatus is known, and a detailed description thereof will be omitted in this specification.

The magnetic storage apparatus 70 is characterized by the magnetic recording media 76. Each of the magnetic recording media 76 has the stacked structure of any of the embodiments or modifications of the magnetic recording medium described above in conjunction with FIGS. 2 through 16. In other words, each of the magnetic recording media 76 may have the structure of any of the magnetic recording media 20, 40 and 50 shown particularly in FIGS. 14, 21 and 22. Of course, the number of magnetic recording media 76 is not limited to 3, and only 1, 2 or 4 or more magnetic recording media 76 may be provided.

The basic construction of the magnetic storage apparatus is not limited to that shown in FIGS. 23 and 24. In addition, the magnetic recording medium 76 used in the present invention is not limited to a magnetic disk. For example, the magnetic recording medium 76 may be a magnetic tape. When using the magnetic tape as the magnetic recording medium 76, the magnetic storage apparatus may be formed by a helical scan type video tape recording and/or reproducing apparatus or, a magnetic tape apparatus for computers which forms a plurality of tracks in a direction taken along the width of the magnetic tape.

According to the magnetic storage apparatus 70, it is possible to carry out a highly reliable high-density recording, because each magnetic recording medium 76 has satisfactory write performances, a satisfactory thermal stability of written bits and low medium noise.

The recording method may magnetically record information on a magnetic recording medium which comprises a first magnetic layer, a nonmagnetic coupling layer provided on the first magnetic layer, and a second magnetic layer provided on the nonmagnetic coupling layer, where the first and second magnetic layers are exchange-coupled and have magnetization directions which are mutually parallel in a state where no external magnetic field is applied thereto. In this case, the recording method may include the steps of applying a recording magnetic field on the magnetic recording medium to record the information on the magnetic recording medium, wherein a recording magnetic field Hh1 applied to the first magnetic layer, a recording magnetic field Hh2 applied to the second magnetic layer, an exchange field HE1 acting on the first magnetic layer from the second magnetic layer, an exchange field HE2 acting on the second magnetic layer from the first magnetic layer, a dynamic coercivity Hc1' of the first magnetic layer, and a dynamic coercivity Hc2' of the second magnetic layer satisfy a relationship (Hh1−HE1−Hc1')>(Hh2−HE2−Hc2')>0.

On the other hand, the recording method may magnetically record information on a magnetic recording medium which comprises a ferromagnetic layer, a first nonmagnetic coupling layer, a first magnetic layer, a second nonmagnetic coupling layer and a second magnetic layer which successively stacked, where the ferromagnetic layer and said first magnetic layer are exchange-coupled and have magnetization directions which are mutually antiparallel in a state where no external magnetic field is applied thereto, and the first and second magnetic layers are exchange-coupled and have magnetization directions which are mutually parallel in a state where no external magnetic field is applied thereto. In this case, the recording method may include the steps of applying a recording magnetic field on the magnetic recording medium to record the information on the magnetic recording medium by switching the magnetization directions of the first and second magnetic layers, wherein the magnetization direction of the ferromagnetic layer switches when the recording magnetic field is removed after applying the recording magnetic field to make the magnetization directions of the ferromagnetic layer and the first and second magnetic layers mutually parallel, and the magnetization direction of the ferromagnetic layer and the magnetization directions of the first and second magnetic layers are mutually antiparallel in a state where no recording magnetic field is applied thereto.

Further, the present invention is not limited to these embodiments, but various variations and modifications may be made without departing from the scope of the present invention.

What is claimed is:

1. A magnetic recording medium including a substrate comprising:

a first magnetic layer;

a nonmagnetic coupling layer provided on the first magnetic layer; and a second magnetic layer provided on the nonmagnetic coupling layer, wherein the first magnetic layer is disposed closer to the substrate than the second magnetic layer, said first and second magnetic layers being exchange-coupled, and having magnetization directions which are oriented in the same direction in a state where no external magnetic field is applied thereto, wherein a dynamic coercivity $Hc1'$ of the first magnetic layer and a dynamic coercivity $Hc2'$ of the second magnetic layer satisfy a relationship $Hc1'<Hc2'$, and the first magnetic layer switches the magnetization direction thereof before the second magnetic layer in response to a recording magnetic field which switches the magnetization directions of the first and second magnetic layers.

2. The magnetic recording medium as claimed in claim 1, wherein a static coercivity $Hc1$ of the first magnetic layer and a static coercivity $Hc2$ of the second magnetic layer satisfy a relationship $Hc1<Hc2$.

3. The magnetic recording medium as claimed in claim 1, wherein said nonmagnetic coupling layer is made of a material selected from a group consisting of Ru, Rh, Ir, Ru alloy, Rh alloy and Ir alloy.

4. The magnetic recording medium as claimed in claim 1, wherein each of said first and second magnetic layers is made of a material selected from a group consisting of Ni, Fe, Co, Ni alloy, Fe alloy and Co alloy.

5. The magnetic recording medium as claimed in claim 1, further comprising:
   a magnetic bonding layer made of a ferromagnetic material and provided between the first magnetic layer and the nonmagnetic coupling layer,
   said magnetic bonding layer and said second magnetic layer being exchange-coupled, and having magnetization directions which are mutually parallel in a state where no external magnetic field is applied to the magnetic recording medium.

6. The magnetic recording medium as claimed in claim 1, further comprising:
   a magnetic bonding layer made of a ferromagnetic material and provided between the nonmagnetic coupling layer and the second magnetic layer,
   said first magnetic layer and said magnetic bonding layer being exchange-coupled, and having magnetization directions which are mutually parallel in a state where no external magnetic field is applied to the magnetic recording medium.

7. The magnetic recording medium as claimed in claim 1, further comprising:
   an exchange layer structure, provided under the first magnetic layer, made up of a ferromagnetic layer and a second nonmagnetic coupling layer provided on the ferromagnetic layer,
   said ferromagnetic layer and said first magnetic layer being exchange-coupled, and having magnetization directions which are mutually antiparallel in a state where no external magnetic field is applied to the magnetic recording medium.

8. The magnetic recording medium as claimed in claim 7, wherein said first magnetic layer switches the magnetization direction thereof before the ferromagnetic layer in response to the recording magnetic field which switches the magnetization directions of the first and second magnetic layers.

9. The magnetic recording medium as claimed in claim 7, wherein a dynamic coercivity $Hc1'$ of the first magnetic layer and a dynamic coercivity $Hc3'$ of the ferromagnetic layer satisfy a relationship $Hc1'<Hc3'$.

10. The magnetic recording medium as claimed in claim 7, wherein a dynamic coercivity $Hc2'$ of the second magnetic layer and a dynamic coercivity $Hc3'$ of the ferromagnetic layer satisfy a relationship $Hc2'<Hc3'$.

11. The magnetic recording medium as claimed in claim 7, wherein a saturation magnetization $Ms1$ and a thickness $t1$ of the first magnetic layer, a saturation magnetization $Ms2$ and a thickness $t2$ of the second magnetic layer, and a saturation magnetization $Ms3$ and a thickness $t3$ of the ferromagnetic layer satisfy a relationship $(Ms3 \times t3)<(Ms1 \times t1 + Ms2 \times t2)$.

12. The magnetic recording medium as claimed in claim 7, further comprising:
   a magnetic bonding layer made of a ferromagnetic material and provided between the ferromagnetic layer and the second nonmagnetic coupling layer and/or between the second nonmagnetic coupling layer and the first magnetic layer.

13. The magnetic recording medium as claimed in claim 1, further comprising:
   an exchange layer structure, provided under the first magnetic layer, and made up of an alternate repetition of a ferromagnetic layer and a second nonmagnetic coupling layer,
   each pair of two adjacent ferromagnetic layers being exchange-coupled via the second nonmagnetic coupling layer interposed therebetween, so that at least one pair of two adjacent ferromagnetic layers have magnetization directions which are parallel to the magnetization direction of the second magnetic layer in a state where no external magnetic field is applied to the magnetic recording medium.

14. A magnetic recording medium including a substrate comprising:
   a first magnetic layer;
   a nonmagnetic coupling layer provided on the first magnetic layer; and
   a second magnetic layer provided on the nonmagnetic coupling layer,
   wherein the first magnetic layer is disposed closer to the substrate than the second magnetic layer,
   said first and second magnetic layers being exchange-coupled, and having magnetization directions which are oriented in the same direction in a state where no external magnetic field is applied thereto,
   wherein the first magnetic layer is made of a CoCr or CoCrPt alloy, the second magnetic layer is made of a CoCrPt alloy, and a Pt content in at. % of the first magnetic layer is lower than that of the second magnetic layer, and the first magnetic layer switches the magnetization direction thereof before the second magnetic layer in response to a recording magnetic field which switches the magnetization directions of the first and second magnetic layers.

15. The magnetic recording medium as claimed in claim 14, wherein said nonmagnetic coupling layer is made of a material selected from a group consisting of Ru, Rh, Ir, Ru alloy, Rh alloy and Ir alloy.

16. The magnetic recording medium as claimed in claim 14, further comprising:
   a magnetic bonding layer made of a ferromagnetic material and provided between the first magnetic layer and the nonmagnetic coupling layer,
   said magnetic bonding layer and said second magnetic layer being exchange-coupled, and having magnetization directions which are mutually parallel in a state where no external magnetic field is applied to the magnetic recording medium.

17. The magnetic recording medium as claimed in claim 14, further comprising:
   a magnetic bonding layer made of a ferromagnetic material and provided between the nonmagnetic coupling layer and the second magnetic layer,
   said first magnetic layer and said magnetic bonding layer being exchange-coupled, and having magnetization directions which are mutually parallel in a state where no external magnetic field is applied to the magnetic recording medium.

18. The magnetic recording medium as claimed in claim 14, further comprising:
an exchange layer structure, provided under the first magnetic layer, made up of a ferromagnetic layer and a second nonmagnetic coupling layer provided on the ferromagnetic layer,
said ferromagnetic layer and said first magnetic layer being exchange-coupled, and having magnetization directions which are mutually antiparallel in a state where no external magnetic field is applied to the magnetic recording medium.

19. The magnetic recording medium as claimed in claim 18, wherein a dynamic coercivity $Hc1'$ of the first magnetic layer and a dynamic coercivity $Hc3'$ of the ferromagnetic layer satisfy a relationship $Hc1'<Hc3'$.

20. The magnetic recording medium as claimed in claim 18, wherein a dynamic coercivity $Hc2'$ of the second magnetic layer and a dynamic coercivity $Hc3'$ of the ferromagnetic layer satisfy a relationship $Hc2'<Hc3'$.

21. The magnetic recording medium as claimed in claim 18, wherein a saturation magnetization $Ms1$ and a thickness $t1$ of the first magnetic layer, a saturation magnetization $Ms2$ and a thickness $t2$ of the second magnetic layer, and a saturation magnetization $Ms3$ and a thickness $t3$ of the ferromagnetic layer satisfy a relationship $(Ms3 \times t3)<(Ms1 \times t1 \times Ms2 \times t2)$.

22. The magnetic recording medium as claimed in claim 18, further comprising:
a magnetic bonding layer made of a ferromagnetic material and provided between the ferromagnetic layer and the second nonmagnetic coupling layer and/or between the second nonmagnetic coupling layer and the first magnetic layer.

23. The magnetic recording medium as claimed in claim 14, further comprising:
an exchange layer structure, provided under the first magnetic layer, and made up of an alternate repetition of a ferromagnetic layer and a second nonmagnetic coupling layer,
each pair of two adjacent ferromagnetic layers being exchange-coupled via the second nonmagnetic coupling layer interposed therebetween, so that at least one pair of two adjacent ferromagnetic layers have magnetization directions which are parallel to the magnetization direction of the second magnetic layer in a state where no external magnetic field is applied to the magnetic recording medium.

24. A magnetic storage apparatus comprising:
at least one magnetic recording medium including a substrate comprising a first magnetic layer, a nonmagnetic coupling layer provided on the first magnetic layer, and a second magnetic layer provided on the nonmagnetic coupling layer, wherein the first magnetic layer is disposed closer to the substrate than the second magnetic layer, said first and second magnetic layers being exchange-coupled and having magnetization directions which are oriented in the same direction in a state where no external magnetic field is applied thereto; and
a head to record information on and/or reproduce information from the magnetic recording medium,
wherein a dynamic coercivity $Hc1'$ of the first magnetic layer and a dynamic coercivity $Hc2'$ of the second magnetic layer satisfy a relationship $Hc1'<Hc2'$ and the first magnetic layer switches the magnetization direction thereof before the second magnetic layer in response to a recording magnetic field which switches the magnetization directions of the first and second magnetic layers.

25. A magnetic storage apparatus comprising:
at least one magnetic recording medium including a substrate comprising a first magnetic layer, a nonmagnetic coupling layer provided on the first magnetic layer, and a second magnetic layer provided on the nonmagnetic coupling layer, wherein the first magnetic layer is disposed closer to the substrate than the second magnetic layer, said first and second magnetic layers being exchange-coupled and having magnetization directions which are oriented in the same direction in a state where no external magnetic field is applied thereto; and
a head to record information on and/or reproduce information from the magnetic recording medium,
wherein the first magnetic layer is made of a CoCr or CoCrPt alloy, the second magnetic layer is made of a CoCrPt alloy, and a Pt content in at. % of the first magnetic layer is lower than that of the second magnetic layer, and the first magnetic layer switches the magnetization direction thereof before the second magnetic layer in response to a recording magnetic field which switches the magnetization directions of the first and second magnetic layers.

* * * * *